(12) United States Patent  
Lautzenhiser

(10) Patent No.: US 8,502,641 B2  
(45) Date of Patent: Aug. 6, 2013

(54) RATE-OF-CHANGE SWITCHES AND CONTROLLABLE APPARATUS

(75) Inventor: John L. Lautzenhiser, Hamilton, IN (US)

(73) Assignee: Intelpro LLC, Belgrade, MT (US)

( * ) Notice: Subject to any disclaimer, the term of this patent is extended or adjusted under 35 U.S.C. 154(b) by 3114 days.

(21) Appl. No.: 09/801,201

(22) Filed: Mar. 7, 2001

(65) Prior Publication Data

US 2001/0048291 A1 Dec. 6, 2001

Related U.S. Application Data

(60) Provisional application No. 60/187,953, filed on Mar. 9, 2000.

(51) Int. Cl.
*G05B 23/02* (2006.01)
*B60R 25/10* (2013.01)

(52) U.S. Cl.
USPC ............ 340/3.9; 340/429; 340/431; 340/4.11

(58) Field of Classification Search
USPC ............. 340/825.19, 3.9, 429, 431, 440, 689; 128/782, 774; 482/8, 900; 33/366, 356
See application file for complete search history.

(56) References Cited

U.S. PATENT DOCUMENTS

| | | | |
|---|---|---|---|
| 3,993,154 A | 11/1976 | Simmons et al. | |
| 4,158,196 A | 6/1979 | Crawford, Jr. | |
| 4,243,024 A * | 1/1981 | Crosbie et al. | 600/19 |
| 4,531,300 A * | 7/1985 | Heidel et al. | 33/366.13 |
| 4,709,197 A * | 11/1987 | Goldhammer et al. | 318/480 |
| 4,865,610 A * | 9/1989 | Muller | 623/24 |
| 5,012,165 A * | 4/1991 | Lautzenhiser et al. | 318/53 |
| 5,023,791 A | 6/1991 | Herzberg et al. | |
| 5,233,662 A | 8/1993 | Christensen | |
| 5,307,048 A | 4/1994 | Sonders | |
| 5,394,035 A * | 2/1995 | Elwell | 327/72 |
| 5,691,703 A * | 11/1997 | Roby et al. | 340/628 |
| 5,742,228 A * | 4/1998 | Levy | 340/429 |
| 5,749,372 A * | 5/1998 | Allen et al. | 600/595 |
| 5,764,726 A | 6/1998 | Selig et al. | |
| 6,837,327 B2 * | 1/2005 | Heinzmann | 180/218 |

* cited by examiner

*Primary Examiner* — Nam V Nguyen
(74) *Attorney, Agent, or Firm* — Valenti Hanley & Robinson, PLLC; Kevin T. Duncan

(57) ABSTRACT

A switching function is performed in response to a predetermined rate-of-change of an output signal, thereby providing rate-of-change switching. Rate-of-change switches (63 and 154) each include a user-controlled transducer (38A, 38B, or 39), a differentiator (40A, 40B, 112, or 156), and a discriminator (42, 114, 134, 160, or 162). The rate-of-change switches (63 and 154) perform at least one switching function when an output from the differentiator (40A, 40B, 112, or 156) or a second differentiator (158) exceeds an allowable magnitude. The rate-of-change switches (63 and 154) may be used to control a timed-opportunity switch (26 or 172), a conveyance, such as a wheelchair (12), and such functions as extending and retracting leg supports, and/or an environmental control unit (14 or 174). The rate-of-change switches (63 or 154) may be attached to a body member (18, 64, or 67) and be actuated by body-member gestures.

24 Claims, 22 Drawing Sheets

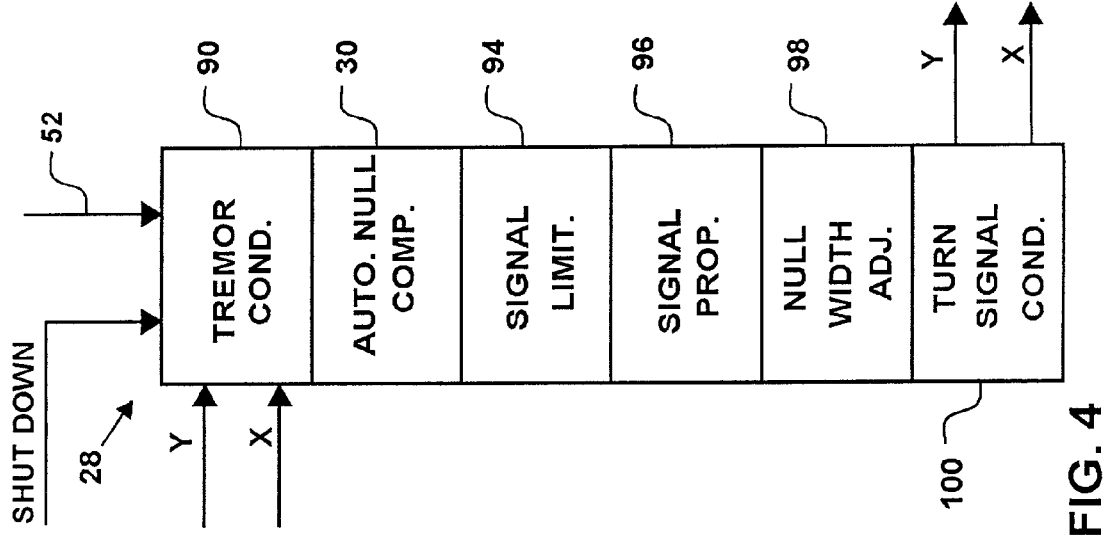
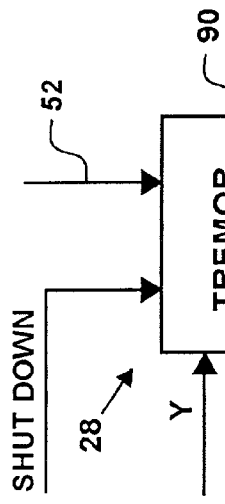
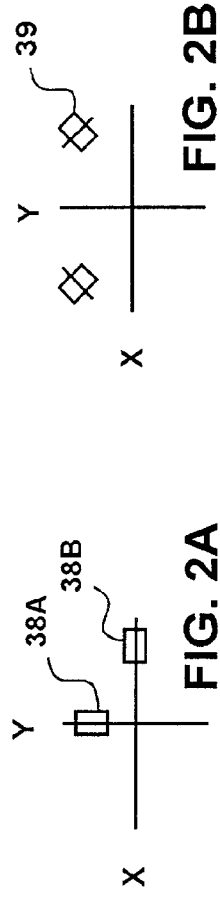
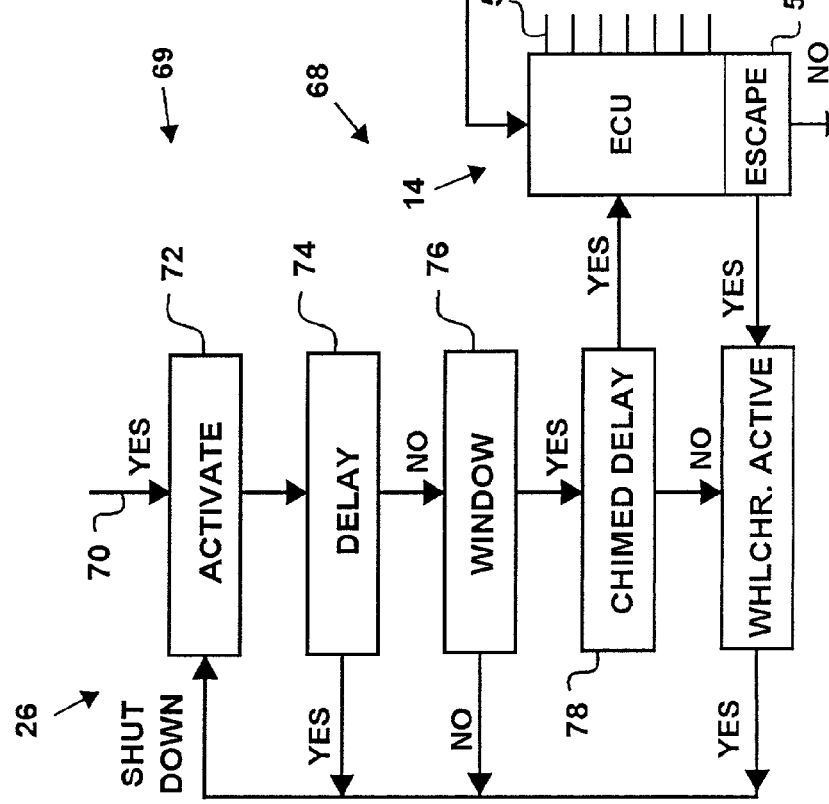

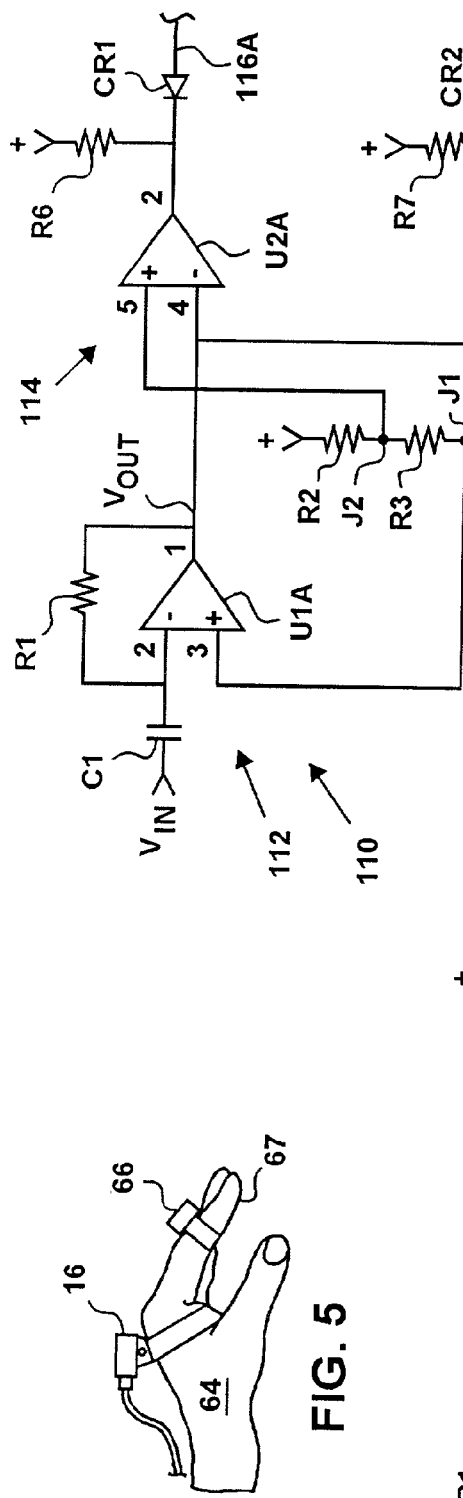
FIG. 5
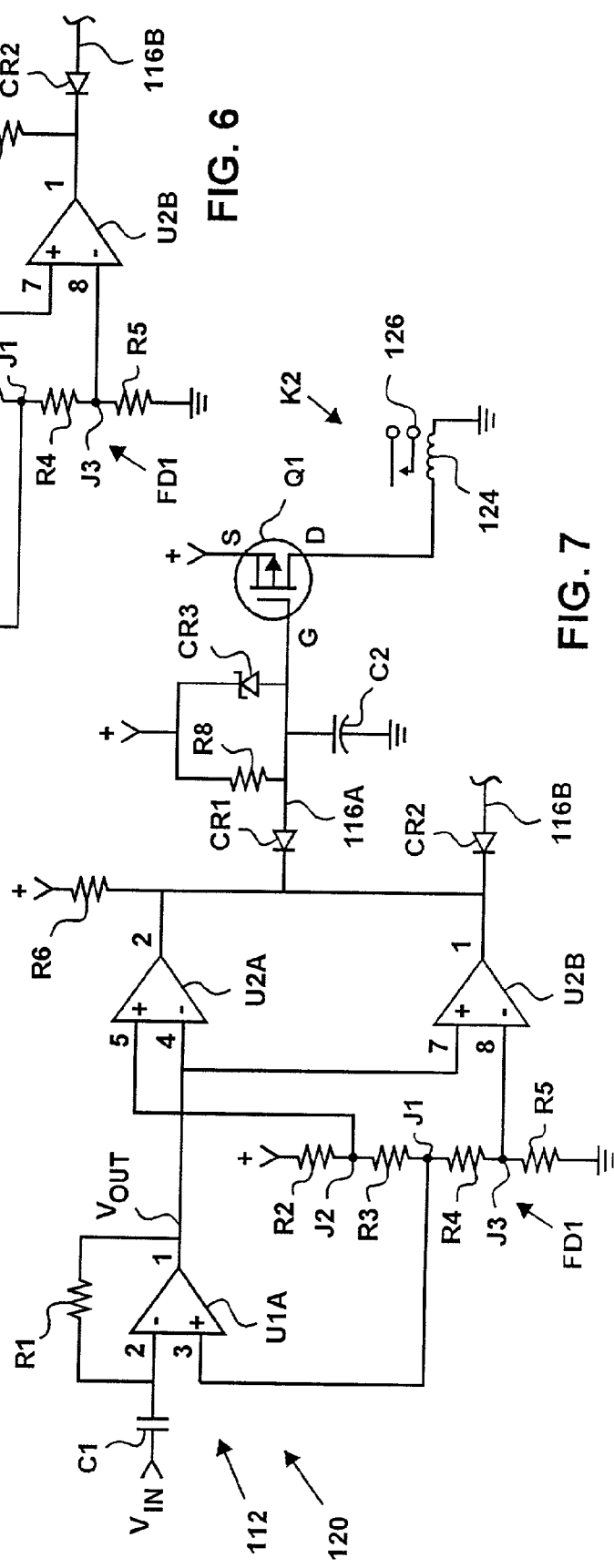
FIG. 6
FIG. 7

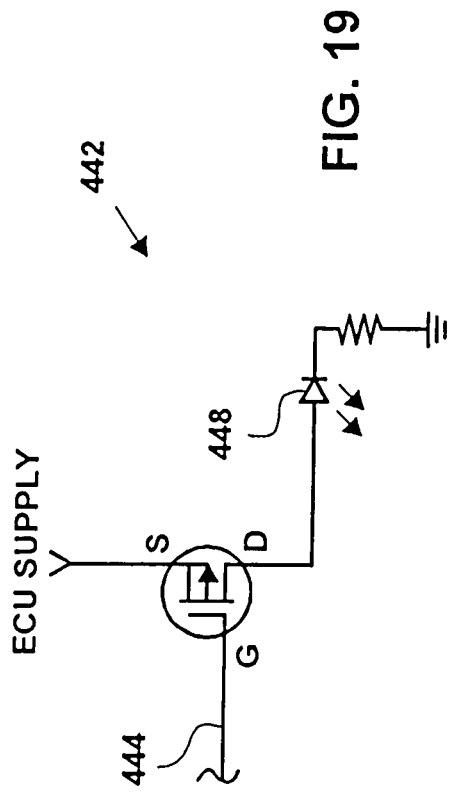
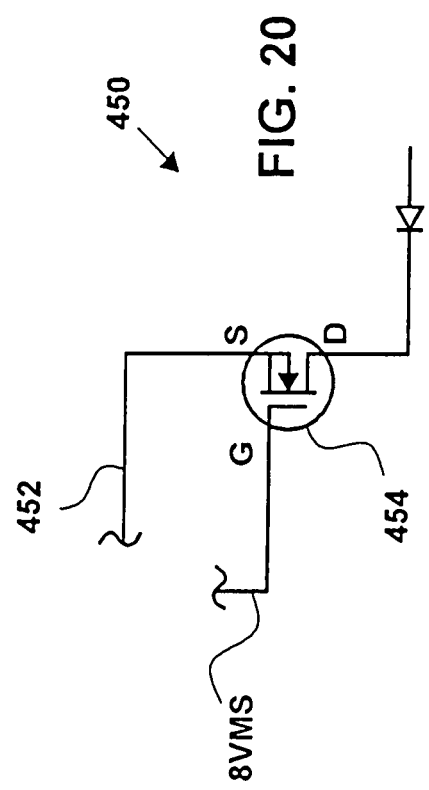

RATE-OF-CHANGE SWITCHES AND CONTROLLABLE APPARATUS

CROSS-REFERENCE TO RELATED APPLICATION

This application claims the benefit of U.S. Provisional Patent Application No. 60/187,953, filed 9 Mar. 2000.

STATEMENT RE FEDERALLY SPONSORED RESEARCH OR DEVELOPMENT

Not Applicable

SEQUENCE LISTING

Not Applicable

BACKGROUND OF THE INVENTION

1. Field of the Invention

The present invention relates generally to switches and use of switches for controlling an apparatus and/or a multiplexer. More particularly, the present invention relates to a switch whose output status changes in response to a predetermined rate-of-change of an output signal, and to controlling both switching and proportional functions of an apparatus and/or a multiplexer in response to output signals.

2. Description of the Related Art

In recent years there has been an increasing awareness of the importance, not only providing for the needs of handicapped persons, but also of utilizing them as productive members of society, rather than keeping them partially or wholly dependent upon others.

Fortunately, this enlightened view has coincided with giant strides in technology, particularly electronics and computed-based technology, and this increase in technology has been reflected by giant strides in electrically-propelled wheelchairs.

The prior art includes electrically-propelled wheelchairs in which control of start, stop, and steering has been achieved by manually-actuated X-Y transducers, commonly called "joysticks."

Lautzenhiser et al., in U.S. Pat. No. 4,906,906, issued 6 Mar. 1990, and in U.S. Pat. No. 4,978,899, issued 18 Dec. 1990, teach wheelchairs that are propelled by pulse-width-modulated voltages, that are dynamically braked by shorting the motors, that are made freewheeling without the expense and complexity of a clutch, and in which tremor control is provided, so that those who have hand tremors can easily and accurately control power wheelchairs.

The prior art includes attempts to control wheelchairs by sipping or puffing on a tube. However, controllability of sip-and-puff units has been marginal, especially for those who depend upon a respirator or ventilator for breathing, since they can puff into a tube only while exhaling, and sipping is even more difficult.

In U.S. Pat. No. 5,635,807, which issued on 3 Jun. 1997, Lautzenhiser teaches electric control systems that provide nonlinear relationships between X-Y mechanical inputs and resultant differential speeds of two propulsion motors. These nonlinear relationships between X-Y mechanical inputs and electrical outputs allow many handicapped persons, who otherwise would be limited to sip-and-puff systems, to control a wheelchair by joystick movement.

Perhaps even more significantly, when a joystick is replaced with two tiny transducers or input devices that are mounted to a person's head, or to an other body member, these nonlinear relationships allow easy and accurate control of both speed and steering of power wheelchairs by means of body-component movements. For instance, a person who is paralyzed from the neck down can perform all control functions of an electrically propelled wheelchair except for connecting and disconnecting power to the system.

In U.S. Pat. No. 5,635,807, Lautzenhiser also provides adjustable transducer sensitivity, steering sensitivity control that is adjustable, selectively-adjustable signal limiting so that maximum speeds can be selectively adjusted, and over-range shutdown.

In U.S. patent application Ser. No. 09/652,395, filed 31 Aug. 2000, Lautzenhiser et al. teach a tilt-axis X-Y input device that may be mounted to a body component, such as the head or a hand of a user, null compensators that automatically compensate for errors in attaching the X-Y input device to a head or other body component, a null-width generator that adjustably provides a neutral zone to help an operator find and hold a neutral position, a turn-signal conditioner that provides easier control of turns including elimination of "fishtailing," tremor control for those with body tremors, adjustable tilt-axis sensitivity to selectively match the motor skills of the user, and overrange shutdown as a safety feature.

In the same patent application, Lautzenhiser et al. teach control of a second device, such as a computer and its cursor, both of which may utilize voice-recognition technology to provide the required switching functions.

Even with the great strides that have been provided by head and other body-component control of both speed and turns of power wheelchairs, much still needs to be accomplished. Many still are unable to control their own safety except by the use of a call button. Many are unable to control their own comfort and productivity needs, such as adjusting leg supports, head supports, backrests, heating, cooling, and lighting. And many are unable to control productivity devices, such as computers, and entertainment devices, such as radio or television.

It is these other safety, comfort, productivity, and entertainment needs that the present patent application addresses.

In the industry, apparatus for controlling safety, productivity, comfort, and entertainment devices have been called "Environmental Control Units" (ECU). Therefore, this terminology is used extensively in the detailed description.

BRIEF SUMMARY OF THE INVENTION

The present invention includes rate-of-change control devices, timed-opportunity switches, and multiplexers, or environmental control units (ECUs).

More particularly, the present invention provides rate-of-change switches, or rate-of-change control devices, that actuate in response to adjustable rate-of-change thresholds, timed-opportunity switches that can be actuated by one or more appropriately-timed inputs, and multiplexers, or ECUs, that can be used by physically-handicapped persons to control such things as wheelchair and hospital bed positioning actuators, lighting, entertainment, communication, computer and productivity devices.

The timed-opportunity switches and the ECUs can be actuated by any type of momentary-contact switch. However, preferably, the rate-of-change control devices of the present invention are used in combination with mechanical-to-electrical transducers.

With regard to the rate-of-change control devices, repeated ones of output signals, from transducers such as X-Y tilt sensors, are differentiated with respect to time, and then discriminated to provide rate-of-change switching functions that can be used to control start-up (power on) of power wheelchairs, to control environmental control units (ECUs), and/or to provide a safety shutdown for power wheelchairs. Additionally, the rate-of-change control devices may be used to control wheelchair and hospital bed positioning actuators, lighting, entertainment, communication, computer and productivity devices If an input position of a mechanical-to-electrical transducer is "y," then the output is equal to f(y). Thus, it is equally accurate to speak of differentiating the input or the output, although from a practical standpoint, the electrical output is differentiated.

While highly successful results have been achieved by differentiating only once, thereby producing values that are a function of the velocity of the input "y," alternately, the electrical outputs are differentiated twice, thereby providing values that are a function of the acceleration of the input "y."

The rate-of-change control devices have two basic advantages. One is that they can use the output of transducers, such as head-attached X-Y tilt sensors that are used to control speed and steering of wheelchairs, to provide switching functions. An other advantage is that the rate-of-change control devices are self-centering, or self-nulling. That is, they function by differentiating an output, and the differential of a constant is zero. Therefore, when an output of a transducer is constant, the rate-of-change control device does not produce an output.

By differentiating signals generated by a two-axis transducer, such as an X-Y tilt sensor, two rate-of-change signals are produced for each axis, one for an increase in the output signal, and one for a decrease in the output signal.

Preferably, the rate-of-change control device that is used with the timed-opportunity switch, the ECU, and the signal conditioner that is shown herein, produces a single switching output from the four rate-of-change signals.

That is, switching occurs when any one of four rates-of-change is beyond a preselected threshold. For instance, when used with a head-attached X-Y input device, a nod of the head can be used to produce a logic "1" output, and returning the head to a level position can be used to produce a second logic "1" output.

In a simplified embodiment of the rate-of-change control devices that are included herein, two rate-of-change switching outputs are produced in response to outputs from a single-axis transducer. One rate-of-change output is produced whenever the rate-of-change of an increasing output exceeds a predetermined magnitude. And, the other rate-of-change output is provided whenever the rate-of-change of a decreasing output exceeds a predetermined magnitude. However, this embodiment can be simplified further by eliminating one comparator. Then, only one output will be produced.

In a slightly more complex embodiment of the rate-of-change control devices, two rate-of-change switching outputs are produced from a single-axis transducer, the two rate-of-change outputs are combined to produce a single switching output, and the single switching output is used to control a relay.

In other embodiments of the rate-of-change control devices, switching outputs are produced that are combinations of one or more sequential rate-of-change signals. For instance, an "1" output can be made to equal A AND B, by holding A until B occurs, or visa versa.

Or a logic "1" can be made to equal "A AND A," where "A AND A" refers to two "A" signals that are sequential, and the first "A" signal is held until the second "A" signal occurs.

Therefore, although only four logic "1" signals are available from a two-axis transducer, by using digital logic, a large number of logic outputs can be produced.

One of the rate-of-change control devices, or any momentary-contact switch, may be used to initiate the timed-opportunity switch. If a switched signal is provided within a first window-of-opportunity, power is supplied to a first apparatus, such as an electrically-propelled wheelchair. Or, if a switched signal is provided within a second window-of-opportunity, the environmental control unit becomes controllable by the rate-of-change control device, or any momentary-contact switch.

In an other application of the rate-of-change control devices, a rate-of-change signal exceeding a preset threshold will shut down the electrically-propelled wheelchair. This signal will occur in such instances as an X-Y transducer being knocked off of the head of a user, if some force jars the head of the user, and even if the cord from the X-Y transducer is given a sudden jerk.

It is important to remember that a constant value, differentiated as a function of time, is zero. Therefore, no matter what constant output a transducer may produce when it is at null, or is not being actuated, dy/dt is zero.

Therefore, while rate-of-change control devices have been shown and described in conjunction with proportional-output transducers that are used to control apparatus, such as a power wheelchair, the rate-of-change control devices of the present invention may be used with any transducer that will produce a change in output in response to an input.

Further, since the neutral position of a transducer, that is used with the rate-of-change control device, is whatever input position the transducer has immediately preceding a rate-of-change that is of sufficient magnitude to cause switching, there is no requirement that the transducer have a neutral position, that its output be even relatively repeatable, that its output be even relatively free of drift, or that it be even relatively free of hysteresis.

As defined herein, a rate-of-change control device includes a differentiator and whatever additional components may be required to perform the desired switching functions in response to an input received from a transducer. When a transducer is included with the rate-of-change control device, the combination is a rate-of-change switch.

In a first aspect of the present invention, a switch comprises: a transducer that produces an output signal in response to a user input; a differentiator connected to the output signal; and means, connected to the differentiator, for performing a first switching function.

In a second aspect of the present invention, a switch comprises: a transducer that produces an output signal in response to a user input; a first differentiator connected to the output signal; a second differentiator connected to the first differentiator; and means, connected to the second differentiator, for performing a first switching function.

In a third aspect of the present invention, a method comprises: producing an output signal in response to a user input; differentiating the output signal with respect to time; and performing a first switching function in response to the differentiated output signal.

In a fourth aspect of the present invention, a method comprises: body-member tilting a first tilt-sensitive transducer; producing a first output signal proportional to the tilting step; differentiating the first output signal with respect to time; and performing a first switching function in response to the differentiated first output signal.

In a fifth aspect of the present invention, a method comprises: body-member actuating a transducer; producing an output signal proportional to the body-member actuating step; and performing a switching function in response to a rate-of-change of the output signal.

In a sixth aspect of the present invention, a method comprises: body-member producing first and second proportional output signals; and controlling both first and second proportional functions and a switching function of an apparatus in response to the output signals.

In a seventh aspect of the present invention, a switch comprises: a mechanical-to-electrical transducer; a differentiator connected to the transducer; and a comparator connected to the differentiator.

In an eighth aspect of the present invention, a switch comprises: a transducer that produces increasing and decreasing output signals proportional to user actuation in first and second directions; and means, for producing a second switching function in response to a predetermined rate-of-change of the output signal produced by user actuation of the transducer in one of the directions.

In a ninth aspect of the present invention, a method comprises: producing an output signal; selectively performing a switching function in response to the output signal; preventing variations in the output signal from performing the switching function; and performing the switching function in response to a predetermined rate-of-change of the output signal.

In a tenth aspect of the present invention, a method comprises: producing an output signal that is a function of an input; controlling an apparatus in response to the output signal; and performing a switching function in response to a predetermined rate-of-change of the output signal.

In an eleventh aspect of the present invention, a method comprises: performing a body-member gesture; controlling an output signal in response to the body-member gesture; maintaining a switch output status irrespective of the body-member gesture; and changing the switch output status in response to a predetermined velocity of the performing step.

In a twelfth aspect of the present invention, a method comprises: performing a body-member gesture; controlling an output signal in response to the body-member gesture; maintaining a switch output status irrespective of the controlling step; and changing the switch output status in response to a predetermined rate-of-change of the output signal.

In a thirteenth aspect of the present invention, a switch comprises: a transducer that produces an output proportional to an input; and means, that is connected to the transducer, for producing a switching function whenever a rate-of-change of the output in a selected direction reaches a predetermined magnitude.

In a fourteenth aspect of the present invention, a method comprises: activating an apparatus; and the activating step comprises manually actuating a transducer and differentiating an output of the transducer.

In a fifteenth aspect of the present invention, a method comprises: selectively activating a first or a second apparatus; and the selective activating step comprises manually actuating a transducer and differentiating an output of the transducer.

In a sixteenth aspect of the present invention, a method comprises: initiating cascading of a plurality of task opportunities; and the initiating step comprises manually actuating a transducer and differentiating an output of the transducer.

BRIEF DESCRIPTION OF THE SEVERAL VIEWS OF THE DRAWINGS

FIG. 2A is an illustration showing orientation of transducers with respect to X and Y axes wherein tilt actuation around the X-axis produces Y outputs that control forward and reverse speeds, and wherein tilt actuation around the Y-axis produces X outputs that are used for controlling left and right turns;

FIG. 2B is an illustration showing orientation of transducers with respect to X and Y axes wherein actuation around either axis, X or Y. produces outputs from both transducers;

FIG. 3 is a block diagram of the timed-opportunity switch and the environmental control unit (ECU) of FIG. 1;

FIG. 4 is a block diagram of the signal conditioner of FIG. 1 that includes an automatic null compensator;

FIG. 5 is a partial view of a human hand, showing a tilt-axis X-Y input device attached to the hand by means of a band, and a tilt-axis input device for a single axis that is attached to a finger by means of a ring, or smaller band;

FIG. 6 is a schematic drawing of a rate-of-change control device in which two rate-of-change switching signals are produced from a single transducer, illustrating that four rate-of-change outputs can be produced from two transducers, such as a tilt-axis X-Y input device;

FIG. 7 is a schematic diagram of a rate-of-change control device for use with a single transducer, showing circuitry for producing two rate-of-change outputs that actuate a relay when either of the two rate-of-change outputs exceed a predetermined magnitude;

FIG. 19 is a schematic drawing of the ECU status that is duplicated fifteen times to provide ten task LED indicators and five escape LED indicators in the light display of block K of FIG. 17;

FIG. 20 is a schematic drawing of the ECU escape control, of block P of FIG. 17, that is duplicated five times, as indicated by five escape LEDs in the light display of block K of FIG. 17;

DETAILED DESCRIPTION OF THE INVENTION

Figure 1:
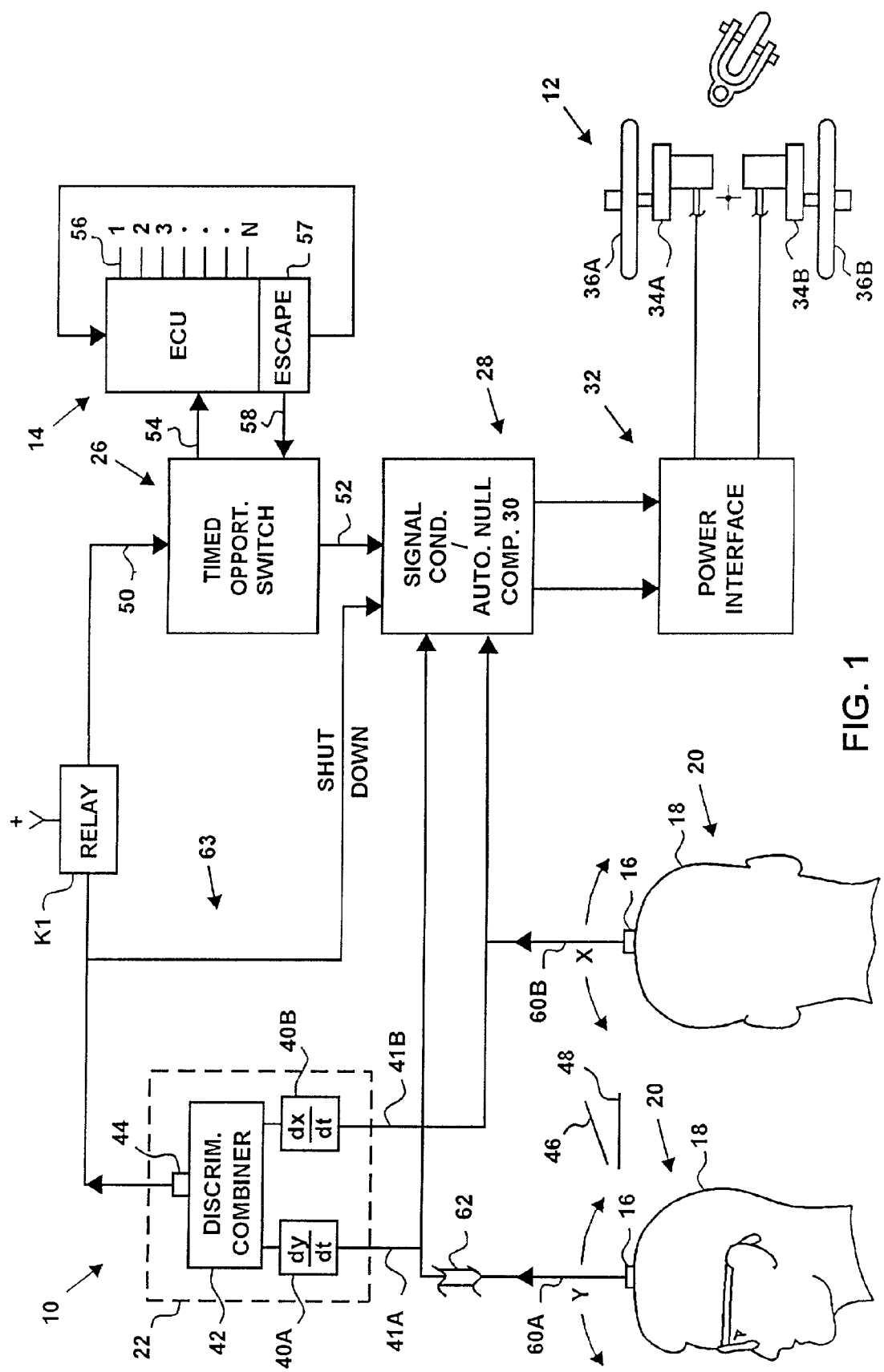
FIG. 1 is a block diagram of an environmental control unit (ECU) and an electrically-powered conveyance that are selectively controlled by head-actuated X- and Y-axis tilt-sensors, a rate-of-change control device, and a timed-opportunity switch.

Referring now to FIG. 1, a control system 10 is provided for control of an electrically-powered conveyance, or power wheelchair 12, and an environmental control unit (ECU) 14 by an X-Y input device, such as a tilt-axis X-Y input device or tilt-axis X-Y transducer 16, that are tilt sensitive, and that may be mounted to a head 18 of a person 20.

The head 18 of the person 20 is shown in both side and back views to illustrate movement of the head 18 with respect to X and Y axes. Thus, numbers for the tilt-axis X-Y input device 16, the head 18, and the person 20 are placed on both views of the head 18.

The control system 10 includes a rate-of-change control device 22, a relay K1, a timed-opportunity switch 26, a signal conditioner 28 that includes an automatic null compensator 30, and a power interface 32.

The power interface 32 is connected to electric motors 34A and 34B of the power wheelchair 12, and the electric motors 34A and 34B are drivingly connected to wheels 36A and 36B, respectively, of the power wheelchair 12.

Referring now to FIGS. 1 and 2A, the tilt-axis X-Y input device 16 of FIG. 1 preferably includes a Y-axis transducer, or mechanical-to-electrical transducer, 38A that is oriented to be sensitive, exclusively, to tilting around the X-axis, and an X-axis transducer, or mechanical-to-electrical transducer, 38B that is oriented to be sensitive, exclusively, to tilting around the y-axis, as shown in FIG. 2A. However, the systems taught herein are adaptable for use with mechanical-to-electrical transducers 39 that are oriented between X-axis and the Y-axis, as shown in FIG. 2B.

Referring again to FIG. 1, when activated by the timed-opportunity switch 26, the person 20 can control direction of propulsion, speeds of propulsion, and steering of the power wheelchair 12 by moving the head 18 in X and Y directions, as marked, thereby body-member actuating or body-member tilting, the tilt-axis input device 16. Movements of the head 18 in Y directions control forward and reverse speeds, and movements of the head 18 in X directions control turns.

Output signals from the tilt-axis X-Y input device 16 are connected to the signal conditioner 28 wherein the X and Y output signals are conditioned. Signal conditioning may include such functions as tremor control, maximum speed limiting, soft starts, soft stops, signal proportioning, turn-signal conditioning, and null width adjustment, with one of the most important being automatic null compensating, as indicated by the automatic null compensator 30 within the block that indicates the signal conditioner 28. Apparatus and method for providing the above-recited functions are taught by Lautzenhiser in U.S. Pat. No. 5,635,807, issued 3 Jun. 1997 and/or by Lautzenhiser et al. in U.S. patent application Ser. No. 09/652,395, filed 31 Aug. 2000.

The power interface 32 uses the conditioned signals of the signal conditioner 28 to individually control both speed and direction of rotation of the electric motors 34A and 34B.

Continuing to refer to FIG. 1, in addition to being delivered to the signal conditioner 28, the X and Y output signals are delivered to separate ones of differentiators 40A and 40B in the rate-of-change control device 22, one for each output signal, X and Y, by input terminals 41A and 41B.

A discriminator/combiner 42 in the rate-of-change control device 22 produces four rate-of-change signals, one rate-of-change signal each when an output of either of the two transducers 38 of FIG. 2A increases, and one rate-of-change signal each when an output of either of the two transducers 38 decreases.

In mathematical terms, if the input signals are in X and Y centimeters, or X and Y degrees, output signals are a function of, and proportional to, X and Y. The output of one differentiator 40A is dy/dt and the output of the other differentiator 40B is dx/dt.

The discriminator/combiner 42, translates increasing and decreasing rates of change from the two differentiators, 40A and 40B into four rate-of-change outputs. A switching function is performed when any of the four rate-of-change outputs exceed a predetermined allowable magnitude.

When the person 20 moves the head 18 in a forward Y direction, in a rearward Y direction, in a leftward X direction, or in a rightward X direction, one of the differentiators 40A or 40B, produces an output (either dy/dt or dx/dt). If one of the differentiated outputs is sufficiently large, the discriminator 42 produces a low at an output terminal 44.

Continuing to refer to FIG. 1, assume that the head 18 is lowered to an inclination angle 46 from a normal head position 48 with a velocity that produces a predetermined dy/dt. As a result, a first low is produced at the terminal 44 of the rate-of-change control device 22. Assume that, subsequently, the head 18 is raised to the normal head position 48, thereby producing a second low.

If the head 18 is lowered and raised at appropriate times, with sufficient velocity, the rate-of-change control device 22 will initiate the timed-opportunity switch 26. Or, alternately, if the head 18 is moved in any combinations of directions, X and/or Y, at appropriate times, and with sufficient velocity, the timed-opportunity switch 26 will be initiated.

Once the timed-opportunity switch 26 has been actuated by movement of the head 18, or by any other type of switch, by a switching action delivered to an input conductor 50 of the timed-opportunity switch 26, additional movements of the head 18 can be used to initiate power to the wheelchair 12 or to initiate operation of the ECU 14.

A timely movement of the head 18 will initiate control of the wheelchair 12 by movement of the head 18 in X and Y directions, as indicated by an arrow 52.

However, movement of the head 18 at a different time will initiate control of the ECU 14, as indicated by an arrow 54.

With control of the ECU 14 initiated by an appropriately-timed movement of the head 18, as indicated by the arrow 54, tasks 56 can be controlled by appropriately-timed movements of the head 18 as the ECU 14 sequentially cycles through opportunities to control the tasks 56.

Continuing to refer to FIG. 1, after completing control of selected ones of the tasks 56 of the ECU 14, movement of the head 18 at an escape opportunity 57 returns control, to the timed-opportunity switch 26, as indicated by an arrow 58.

A Y-axis output of the X-Y input device 16 is connected to the rate-of-change control device 22 by a y-axis conductor, or forward/reverse conductor, 60A, and an X-axis output of the X-Y input device 16 is connected to the rate-of-change control device 22 by an x-axis conductor, or turn/signal, 60B. Both conductors, 60A and 60B, are part of a lightweight cable 62, as shown with the conductor 60A.

While control of the timed-opportunity switch 26, the ECU 14, and the wheelchair 12 has been shown in conjunction with an X-Y input device, such as the X-Y input device 16, nearly any mechanical-to-electrical transducer may be used with the discriminator/combiner 42, or any momentary-contact switch, not shown, not an inventive part of the invention, can be used to control the timed-opportunity switch 26, the wheelchair 12, and the ECU 14.

When the rate-of-change control device 22 is combined with any transducer, such as the transducer 38 of FIG. 2A, the combination is a rate-of-change switch 63.

Referring now to FIG. 5, alternately, the X-Y input device 16 may be attached to a different body member, such as a hand 64, or a transducer 66 having only a single output may be attached to one or more body members, such as a finger 67.

Referring now to FIGS. 1 and 3, the ECU 14 can function as a stand-alone unit that can be operated by anyone who can make momentary switching contacts by any body member, such as the head 18, the hand 64, and/or the finger 67, using any type of switch, if it is suitable to have the ECU 14 operate continuously.

However, in many instances, it may be desirable to provide protection against the ECU 14 being operated by the person 20 who, perhaps because of medication, is not competent to operate the ECU 14 safely or successfully.

If so, the ECU 14 can be combined with the timed-opportunity switch 26, to provide a stand-alone ECU 68 of FIG. 3 that can be operated by successive momentary switching by any body member, such as the head 18, the hand 64, and/or the finger 67, using any type of switch.

Or, the ECU 14 can be combined with the timed-opportunity switch 26, and any transducer, such as the X-Y input device 16 of FIG. 1 or a transducer 38 of FIGS. 2A or 2B, to provide a stand-alone ECU 69 that can be operated by successive movements of any body member, such as the head 18, the hand 64, or the finger 67.

If any mechanical-to-electrical transducer, such as the X-Y input device 16 of FIG. 1, the transducer 38 of FIGS. 2A or 2B, or the transducer 66 of FIG. 5, is used to control the ECU 14, there is no need to provide a means for centering or nulling outputs of the transducer, 16, 38, or 66, because differentiation results in a zero signal when the output of the transducer, 16, 38, or 66 is constant. Thus differentiation automatically provides a zero each time a body member, such as the head 18, the hand 64, or the finger 67 stops at a given position.

Referring now to FIG. 3, and the timed-opportunity switch 26, if "yes" refers to a signal produced by the rate-of-change control device 22 of FIG. 1, or produced by any other momentary-contact switch, then a "yes" signal in a conductor 70 activates the timed-opportunity switch 26, as indicated by a box 72, and starts a first time delay 74.

If a "yes" signal is inadvertently applied to the timed-opportunity switch 26 during the first time delay 74, as indicated by a "yes" arrow, the timed-opportunity switch 26 shuts down.

However, if the person 20 refrains from generating a "yes" signal during the first time delay 74, the process proceeds to a second time delay, or a first window-of-opportunity 76.

If the person 20 fails to provide a "yes" signal during the first window-of-opportunity 76, as indicated by a "no" arrow, the timed-opportunity switch 26 shuts down. However, if the person 20 provides a "yes" signal during the first window-of-opportunity 76, a third time delay, or second window-of-opportunity, which is also a chimed delay 78, starts.

If the person 20 provides a "yes" signal during the chimed delay 78, as indicated by a "yes" arrow, control of the ECU 14 is given to subsequent "yes" signals.

But, if the person 20 refrains from providing a "yes" signal during the chimed delay 78, control of the power wheelchair 12 of FIG. 1 is delivered to the signal conditioner 28 of FIG. 1.

Assuming that the person 20 has provided a "yes" signal during the chimed delay 78, the ECU 14 starts to cascade through timed-opportunities for tasks 56. A "yes" signal provided at a timed-opportunity for one of the tasks 56 provides opportunity to turn on, turn off, or adjust whatever apparatus is connected to that task 56.

Upon resuming cascading, any other task 56 can be accessed and controlled. Finally, escape from the ECU 14 is achieved by providing a "yes" signal during the escape opportunity 57.

Shutdown of the control system 10 and the power wheelchair 12 is achieved in either of two ways, one voluntary and the other involuntary.

Voluntary shutdown is achieved by producing a "yes" signal at an appropriate time, as indicated by a "yes" signal beside a box marked "wheelchair active" that leads to "shut down."

Involuntary shutdown is a safety feature that occurs any time the wheelchair is active, if the person 20 inadvertently produces a rate-of-change signal that is above an allowable magnitude.

For instance, if the tilt-axis X-Y input device 16 is knocked off of the head 18 of the person 20, the power wheelchair 12 will shut down. If the person 20 becomes unconscious, and the head 18 drops, the wheelchair 12 will shut down. Even if the lightweight cable 62 of FIG. 1 is jerked, the power wheelchair 12 will shut down.

Referring now to FIG. 4, the various functions that are included in the signal conditioner 28 of FIG. 1 are shown as blocks. The signal conditioner 28, which is taught by Lautzenhiser et al. in U.S. patent application Ser. No. 09/652, 395, filed 31 Aug. 2000, is included herein to show how the various functions and components, especially the automatic null compensator 30, combine to work together with the rate-of-change control device 22, the timed-opportunity switch 26, and the ECU 14 of the present invention.

A tremor control 90 of the signal conditioner 28 receives X and Y signals as indicated, and the tremor control 90 compensates for hand tremors, such as those caused by Parkinson's disease.

An automatic null compensator 30 receives X and Y tremor-conditioned signals from the tremor conditioner 90, stores and subtracts a null voltage from the tremor-conditioned signals, so that, whatever the initial position of the head 18 of FIG. 1, both X and Y signals are nulled at the end of the chimed delay 78 of the timed-opportunity switch 26 of FIG. 3.

The nulled X and Y signals are delivered to a signal limiter 94 wherein the X and Y signals are separately and selectably adjusted, so that speeds of propulsion and steering can be selectively limited.

Following the selective limiting of the X and Y signals, a signal proportioner 96 separately and selectively proportions the X and Y signals, thereby, in essence, providing selective adjustment of the sensitivity of individual transducers in the X-Y input device 16.

After selective adjustment of transducer sensitivity, the X and Y signals are delivered to a null width adjuster 98 wherein an adjustable width null is provided for both X and Y signals.

Finally, after providing adjustable null widths, a turn-signal conditioner 100, reduces the Y signal as a function of the X signal, thereby reducing propulsion speeds when turns are made, and thereby enhancing stability and control of the wheelchair 12.

Referring now to FIG. 6, a rate-of-change control device 110 includes a differentiator 112 and a discriminator 114. The differentiator 112 includes an operational amplifier U1A, a capacitor C1, and a resistor R1, and the discriminator 114 includes operational amplifiers U2A and U2B.

The rate-of-change control device 110 also includes a fixed voltage divider FD1 with resistors R2, R3, R4, and R5. Preferably, the resistors R2, R3, R4, and R5 are proportioned to provide 2.5 volts at a junction J1, 3.3 volts at a junction J2, and 1.7 volts at a junction J3 when the voltage divider FD1 is connected to a 5.0 volt source.

Finally, the discriminator 114 includes comparators U2A and U2B, pull-up resistors R6 and R7 that are connected to pins 2 and 1 of comparators U2A and U2B, respectively, and diodes CR1 and CR2 that also are connected to pins 2 and 1 of comparators U2A and U2B, respectively.

Preferably, the operational amplifier U1A, and also an operational amplifier U1D that is included in various embodiments taught herein, are part No. LMC 64841N, manufactured by National Semiconductor of Sunnyvale, Calif. And, preferably the comparators U2A, U2B, and comparators U2C and U2D which are used in some embodiments, are part No. LM339N, also manufactured by National Semiconductor.

Figure 8:
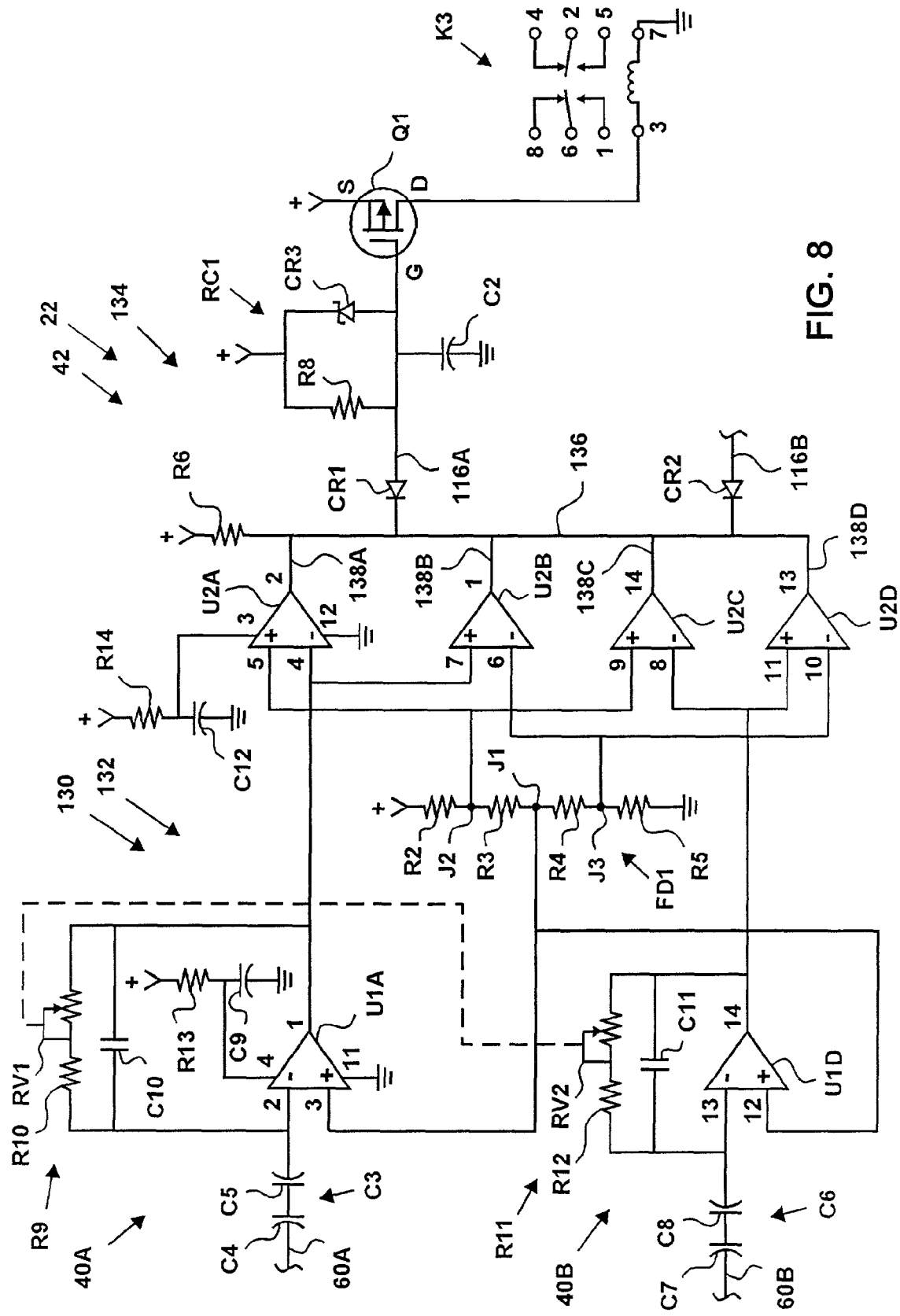
FIG. 8 is a schematic drawing of a rate-of-change control device for use with X-Y transducers, showing circuitry for producing four rate-of-change outputs that actuate a reed switch when any of the four rate-of-change outputs exceed a predetermined magnitude.

Referring for a moment to FIG. 8, comparators U2A, U2B, U2C, and U2D are of the open collector type. That is, pins 2, 1, 14, and 13 are open except when the comparators U2A, U2B, U2C, and U2D are conducting. This fact should be kept in mind when studying the various embodiments.

Referring now to FIGS. 6-8, but more particularly to FIG. 6, a change in an output voltage $V_{OUT}$ is inverse to the direction of the rate-of-change of a voltage. That is, a change in the output voltage $V_{OUT}$ is inverse to dy/dt, assuming that an input to a transducer, such as the transducer 38 of FIG. 2A produces an output f(x) that is proportional to a "y" input.

Further, a change in an output voltage $V_{OUT}$ of the differentiator 112 is equal to (/t)×R1×C1. Therefore, a change in the output voltage $V_{OUT}$, for a given /t, can be selectively adjusted by selectively adjusting the resistor R1. This fact is used to provide adjustable gain in the embodiment of FIG. 8, as will be discussed subsequently.

As shown in FIG. 6, 2.5 volts is supplied to the positive input at pin 3 of the operational amplifier U1A from the junction J1 of the voltage divider FD1. Thus, when dy/dt is equal to zero, the output voltage $V_{OUT}$ at pin 1 of the operational amplifier U1A is 2.5 volts. When dy/dt is positive, the output voltage $V_{OUT}$ drops below 2.5 volts, and when dy/dt is negative, the output voltage $V_{OUT}$ raises above 2.5 volts.

As long as the output voltage $V_{OUT}$ of the operational amplifier U1A, as applied to pin 4 of the comparator U2A, is below the 3.3 volts of pin 5, the output of the comparator U2A will be high, not only because of the pull-up resistor R6 that is connected to a 10.0 volt source, but also because pin 2 is an open collector. However, when the output voltage $V_{OUT}$ of the operational amplifier U1A exceeds 3.3 volts, the comparator U2A pulls pin 2 down to ground.

In like manner, as long as the output voltage $V_{OUT}$ of the operational amplifier U1A, as applied to pin 7 of the comparator U2B, is above the 1.7 volts of pin 6, the output of the comparator U2B will be high, not only because of the pull-up resistor R6 that is connected to a 10.0 volt source, but also because pin 1 is an open collector. However, when the output voltage $V_{OUT}$ drops below 1.7 volts, the comparator U2B pulls pin 1 down to ground.

Therefore, the rate-of-change control device 110 provides two separate rate-of-change switching functions. A voltage in a conductor 116A is pulled down through the diode CR1 in response to a rate-of-change (dy/dt) that decreases by a predetermined magnitude. And a voltage in a conductor 114B is pulled down through the diode CR2 in response to a rate-of-change (dy/dt) that increases by a predetermined magnitude. As described above, the rate-of-change that causes switching is dependent upon values of R1 and C1.

Referring now to FIG. 7, a rate-of-change control device 120 includes like-named and like-numbered components as those of FIG. 6, that function as described in conjunction with FIG. 6.

More particularly, the rate-of-change control device 120 includes the differentiator 112 with its operational amplifier U1A, the feedback resistor R1, and the capacitor C1, the fixed voltage divider FD1 with its resistors, R2, R3, R4, and R5, the junctions J1, J2, and J3, the pull-up resistor R6, the diodes CR1 and CR2, and the conductors 116A and 116B.

The rate-of-change control device 120 ties pins 2 and 1, of the comparators U2A and U2B together, adds a p-channel field-effect transistor (FET) Q1, a pull-up resistor R8, a capacitor C2, a Zener diode CR3, and a relay K2 with a coil 124 and normally-open contacts 126.

Since the FET Q1 is a p-channel FET, a high gate, as provided by the pull-up resistor R8, causes the FET Q1 to function as an open circuit between a source terminal S and a drain terminal D, so that the coil 124 is not energized, normally-open contacts 126 remain open, and the capacitor C2 becomes charged.

When either pin 2 of the comparator U2A or pin 1 of the comparator U2B goes to ground, the diode CR1 allows current flow to the grounded pin (2 or 1), thereby discharging the capacitor C2, and pulling down the voltage on a gate terminal G of the FET Q1.

Thus, it can be seen that, whereas the rate-of-change signal from the comparators U2A and U2B are of short duration, the pull-up resistor R8 and the capacitor C2 form an RC circuit RC1 that provides a switching function of a duration of about 300 milliseconds. That is, the RC circuit RC1 of the pull-up resistor R8 and the capacitor C2, lengthens the closure time of the relay K2 to simulate a manually-actuated, momentary-contact switch.

With regard to the Zener diode CR3, its purpose is to protect the gate G of the FET Q1. And the diode CR2 provides for an additional switching function that may be accessed by connection to the conductor 114B.

Referring now to FIG. 8, a rate-of-change control device 130 includes the differentiators 40A and 40B, which are shown in block-diagram form in FIG. 1, comparators U2A, U2B, U2C, and U2D, the FET Q1, and a reed relay K3.

The differentiator 40A includes the operational amplifier U1A, a feedback resistor R9 that includes a resistor R10 and a potentiometer RV1, and a capacitor C3 that includes capacitors C4 and C5 that are placed back-to-back to make the capacitor C3 nonpolarized.

In like manner, the differentiator 40B includes the operational amplifier U1D, a feedback resistor R11 that includes a resistor R12 and a potentiometer RV2, and a capacitor C6 that includes capacitors C7 and C8 that are placed back-to-back to make the capacitor C6 nonpolarized.

The rate-of-change control device 130 further includes the fixed voltage divider FD1 with the resistors R2, R3, R4, and R5, and the junctions J1, J2, and J3.

The gate terminal G of the FET Q1 is connected to pins 2, 1, 14, and 13 of the comparators U2A, U2B, U2C, and U2D, respectively by the diode CR1. The resistor R8 is a pull-up resistor, and the resistor R8 and the capacitor C2 cooperate to provide the RC circuit, RC1 that provides a predetermined time duration to pull-down signals provided by the comparators U2A, U2B, U2C, and U2D. And the Zener diode CR3 protects the gate of the FET Q1.

Continuing to refer to FIG. 8, as noted above, the differentiators 40A and 40B each include a potentiometer, RV1 or RV2, that is in series with a respective feedback resistor, R10 or R12. Thus, the potentiometers, RV1 and RV2, which are ganged together, as indicated by a phantom line, can be used to selectively adjust thresholds, dy/dt and dx/dt that will actuate the rate-of-change control device 130.

Connection of the operational amplifier U1A and the comparator U2A to a voltage source and ground has been shown. More particularly, a resistor R13 has been added to the operational amplifier U1A that also provides power for the operational amplifier U1D, and a capacitor C9 has been included as a decoupling capacitor. Finally, capacitors C10 and C11 have been included in the differentiators 40A and 40B to enhance stability of differentiation.

The rate-of-change control device 130 adds two more comparators, U2C and U2D, to the comparators U2A and U2B, that are used in the rate-of-change control device 120 of FIG. 7. In addition, connection of the four comparators, U2A, U2B, U2C and U2D to a voltage source by a resistor R14 is shown, together with a capacitor C12 that has been included as a decoupling capacitor.

Finally, in place of the relay K2 of FIG. 7, a reed switch K4 is actuated by the FET Q1, whenever any of pins 2, 1, 14, or 13 of the comparators U2A, U2B, U2C, or U2D, goes to ground.

Operation of the rate-of-change control device 130 is the same as that described for the rate-of-change control device 120 of FIG. 7, except for adding an other operational amplifier, U1D, adding two more comparators, U2C and U2D, and substituting the reed relay, K3 for the relay K2 of FIG. 7.

Subsequently, in conjunction with FIGS. 12 and 13, a control system will be taught that includes a rate-of-change control device.

The rate-of-change control device 132 includes the differentiators 40A and 40B and a discriminator 134. Whereas the discriminator/combiner 42 of FIGS. 1 and 8 includes parts between the pins 1 and 14 of the operational amplifiers U1A and U1B and the conductor 116A, the discriminator 134 does not include a conductor 136 that ties the pins 2, 1, 14, and 13 together, nor the diode CR1.

Thus, the rate-of-change control device 132 provides switching functions in each of four conductors, 138A, 138B, 138C, and 138D, two each for each axis, X or Y. And, as each of the pins 2, 1, 14, and 13 goes to ground, the corresponding conductor 136A, 136B, 136C, and 136D goes low.

Figure 9:
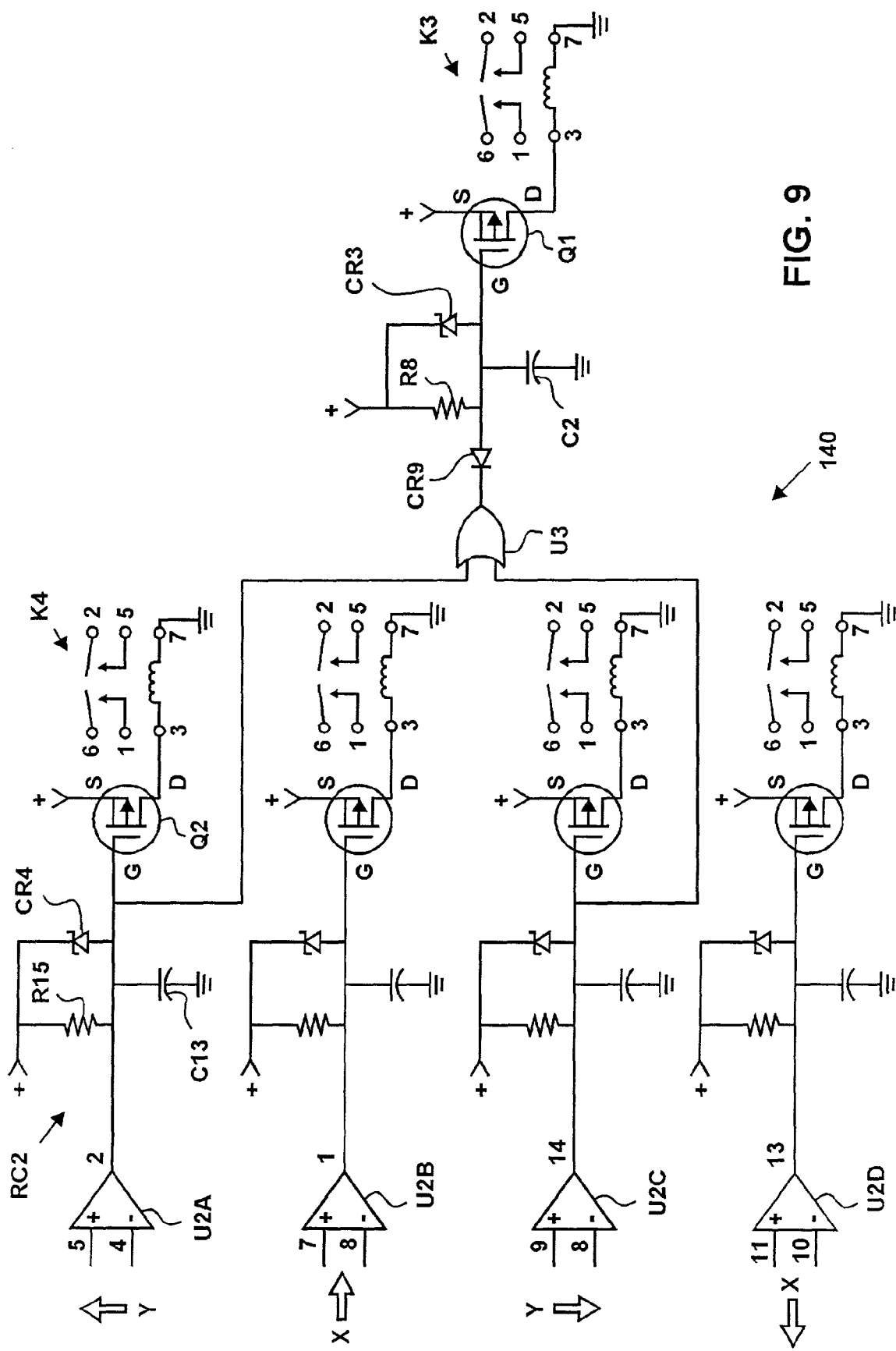
FIG. 9 is a schematic drawing of a rate-of-change control device in which a rate-of-change output is produced in response to sequential inputs, in separate directions, to a single transducer.

Referring now to FIG. 9, a rate-of-change control device 140 includes the differentiators 132A and 132B, the voltage divider FD1, and the comparators U2A, U2B, U2C, and U2D of FIG. 8. The differentiators 132A and 132B and the voltage divider FD1 are not shown in FIG. 9.

The rate-of-change control device 140 of FIG. 9 further includes four p-channel FETs Q2 whose gate terminals G are connected to respective one of pins 2, 1, 14, and 13 of the comparators U2A, U2B, U2C, and U2D, and whose drain terminals D are connected to respective ones of four reed switches K4.

A pull-up resistor R15, a capacitor C13, and the reed switch K4 are connected to each of the four FETs Q2. The pull-up resistor R15 and the capacitor C13 provide an RC circuit RC2 that lengthens the duration of a signal provided by one of the comparators, U2A, U2B, U2C, or U2D.

Thus, four separately switched outputs are provided by respective ones of the reed switches K4, each of which responds to respective movements in X and Y directions, as indicated by arrows and in X and Y designations to the left of respective ones of the comparators, U2A, U2B, U2C, and U2D.

In addition, outputs of the comparators U2A and U2D are connected to an OR gate U3 and a diode CR9. Since the output of the OR gate U3 is low only when both inputs are low, the OR gate U3 lowers the gate terminal G of the FET Q1 and actuates the reed relay K3 only when a transducer, such as the transducer 38 of FIG. 2A, is actuated in one direction, followed closely by actuation in another direction.

That is, if transducer actuation is in a direction, as indicated by an upward arrow at the left of the comparator U2A, pulling an output at the pin 2 low, followed by operation downward, as indicated by a downward arrow to the left of the comparator U2C, pulling the pin 14 low during the time that the RC circuit RC2 is holding pin 2 low, the OR gate U3 will pull the gate of the FET Q1 downward, actuating the reed relay K3.

Figure 10:
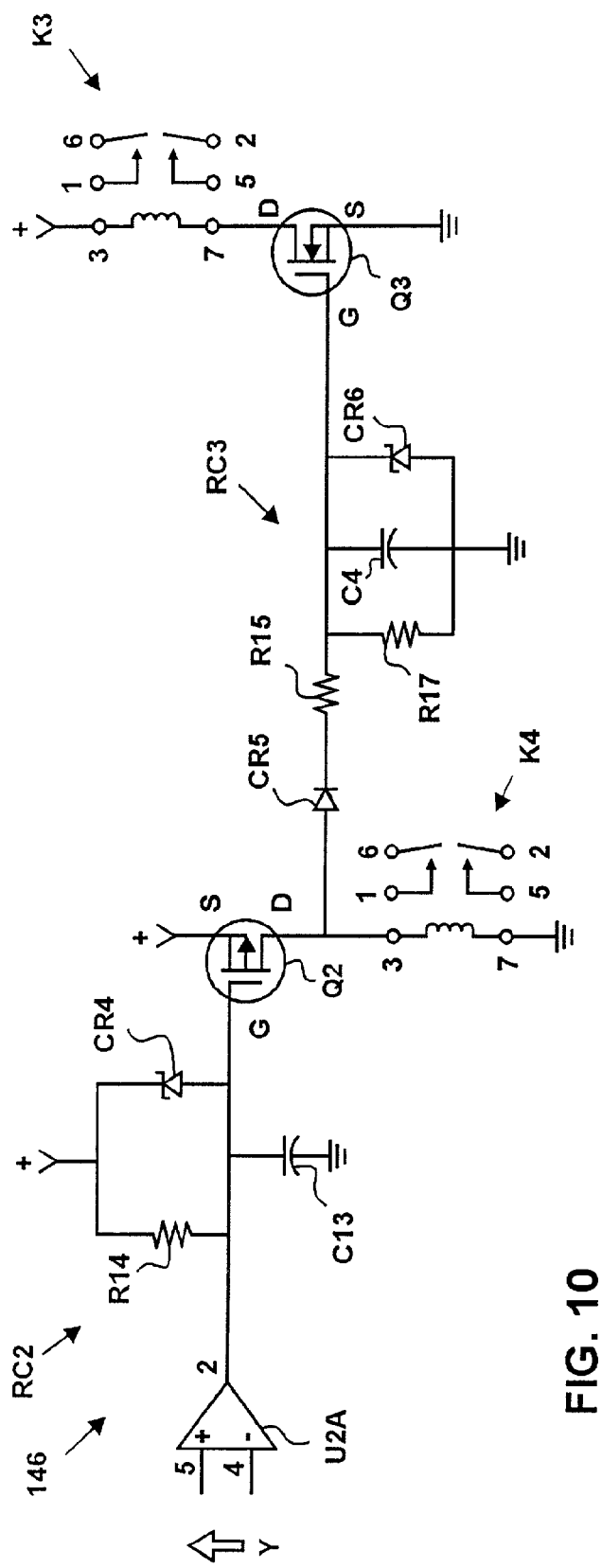
FIG. 10 is a schematic drawing of a rate-of-change control device in which a rate-of-change output is produced in response to two separate and sequential inputs, in the same direction, to a single transducer.

Referring now to FIG. 10, whereas in the rate-of-change control device 140 of FIG. 9, the reed relay K3 is actuated in response to A +B, in a rate-of-change control device 146 of FIG. 10, a reed relay K4 is actuated by two closely spaced lows from the same comparator, U2A.

In operation, when pin 2 of the comparator U2A goes low, the gate of the p-channel FET Q2 is pulled down, causing the FET Q2 to conduct for a period of time that is determined by the RC circuit RC2.

With the FET Q2 conducting for a limited period of time, the capacitor C4 is charged, but not sufficiently to cause an n-channel FET Q3 to conduct. However, if the comparator U2A produces a second low within a time period as determined by an RC circuit RC3, the capacitor C4 becomes sufficiently charged to cause the FET Q3 to conduct, thereby actuating the reed relay K3.

As illustrated by the embodiments of FIGS. 6-10, rate-of-change control devices of the present invention may be designed to perform innumerable digital logic functions.

Figure 11:
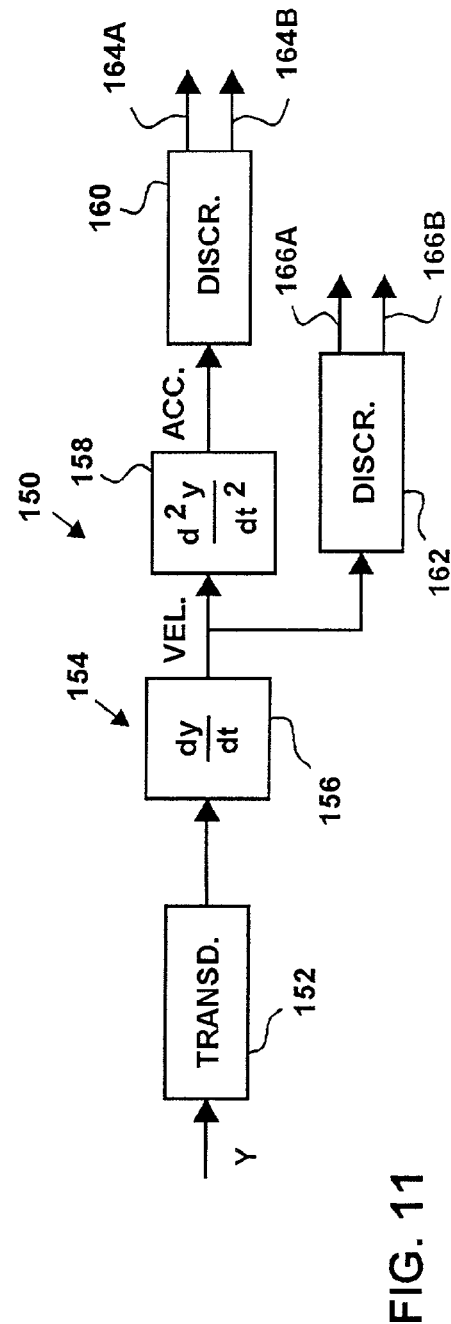
FIG. 11 is a block diagram of a rate-of-change control device in which an output of a mechanical-to-electrical transducer is differentiated twice, and either or both differentiated outputs may be used to control one or more devices.

Referring now to FIG. 11, a rate-of-change control device 150 is connected to a mechanical-to-electrical transducer 152 to provide a rate-of-change switch 154.

The rate-of-change control device 150 includes a first differentiator 156 that may be constructed as taught in conjunction with FIG. 8, a second differentiator 158 that may be constructed similarly, a discriminator 160 that is similar to the discriminator 114 of FIG. 6, and a second discriminator 162 that also is similar to the discriminator 114 of FIG. 6.

If an input to the transducer 152 is either a planar or angular motion, the differentiator produces an output that is a velocity V (dy/dt) of the input of the transducer 152, and the second differentiator 158 produces an output that is the acceleration ($d^2y/dt^2$) of the input to the transducer 152.

The discriminator 160 produces two outputs, 164A and 164B, one each for increasing and decreasing velocities (dy/dt) of the Y input of the transducer 152, as taught in conjunction with FIG. 1. In like manner, the discriminator 162 produces two outputs, 166A and 166B, one each for increasing and decreasing accelerations ($d^2y/dt^2$) of the Y input.

Figure 12:
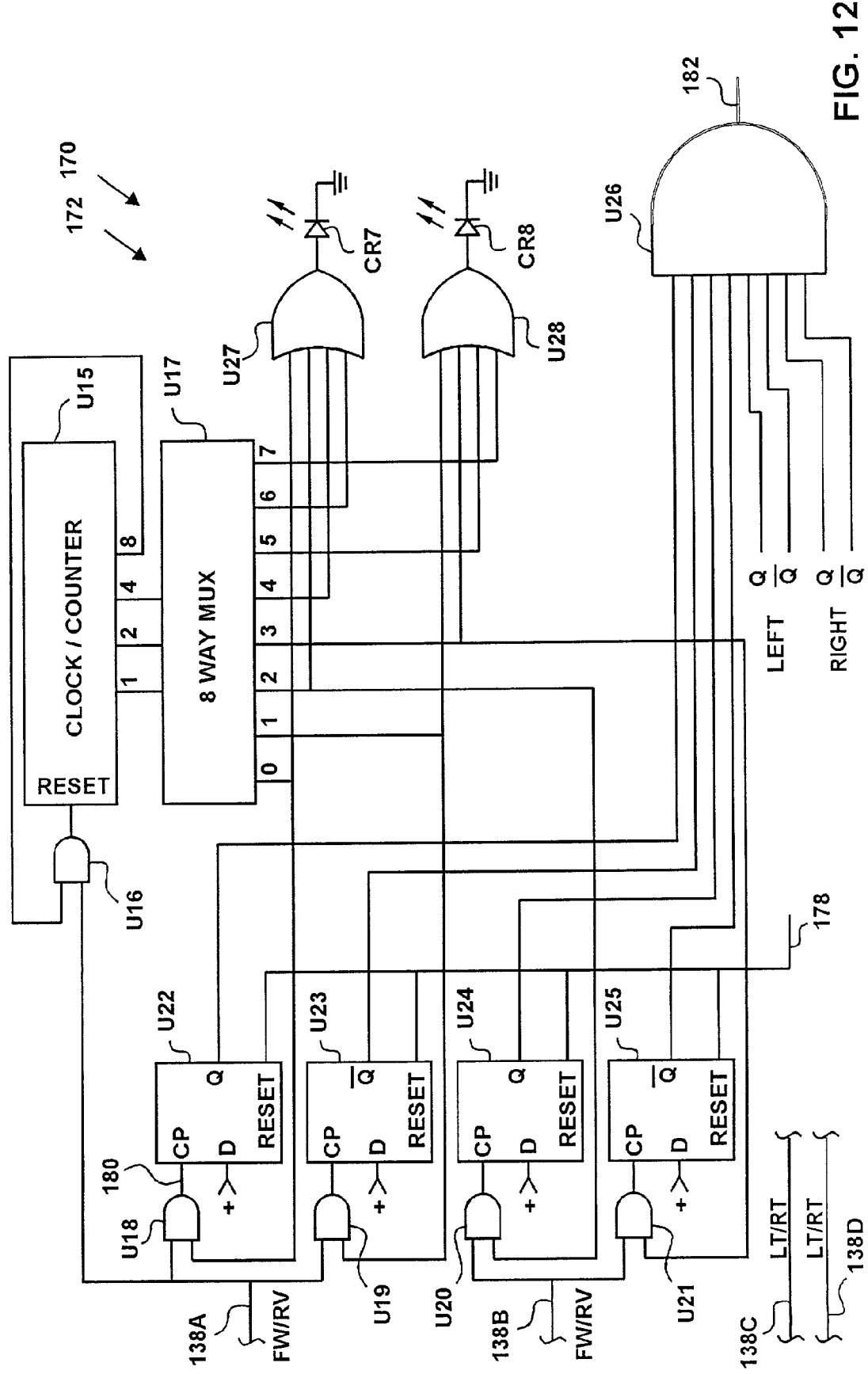
FIG. 12 is a schematic drawing of a portion of a rate-of-change control device in which differentiated outputs of two transducers perform timed-opportunity switching functions and task-selecting functions, and proportional outputs of the transducers control a wheelchair, and a proportional output of one of the transducers provides proportional control of selected tasks.
Figure 13:
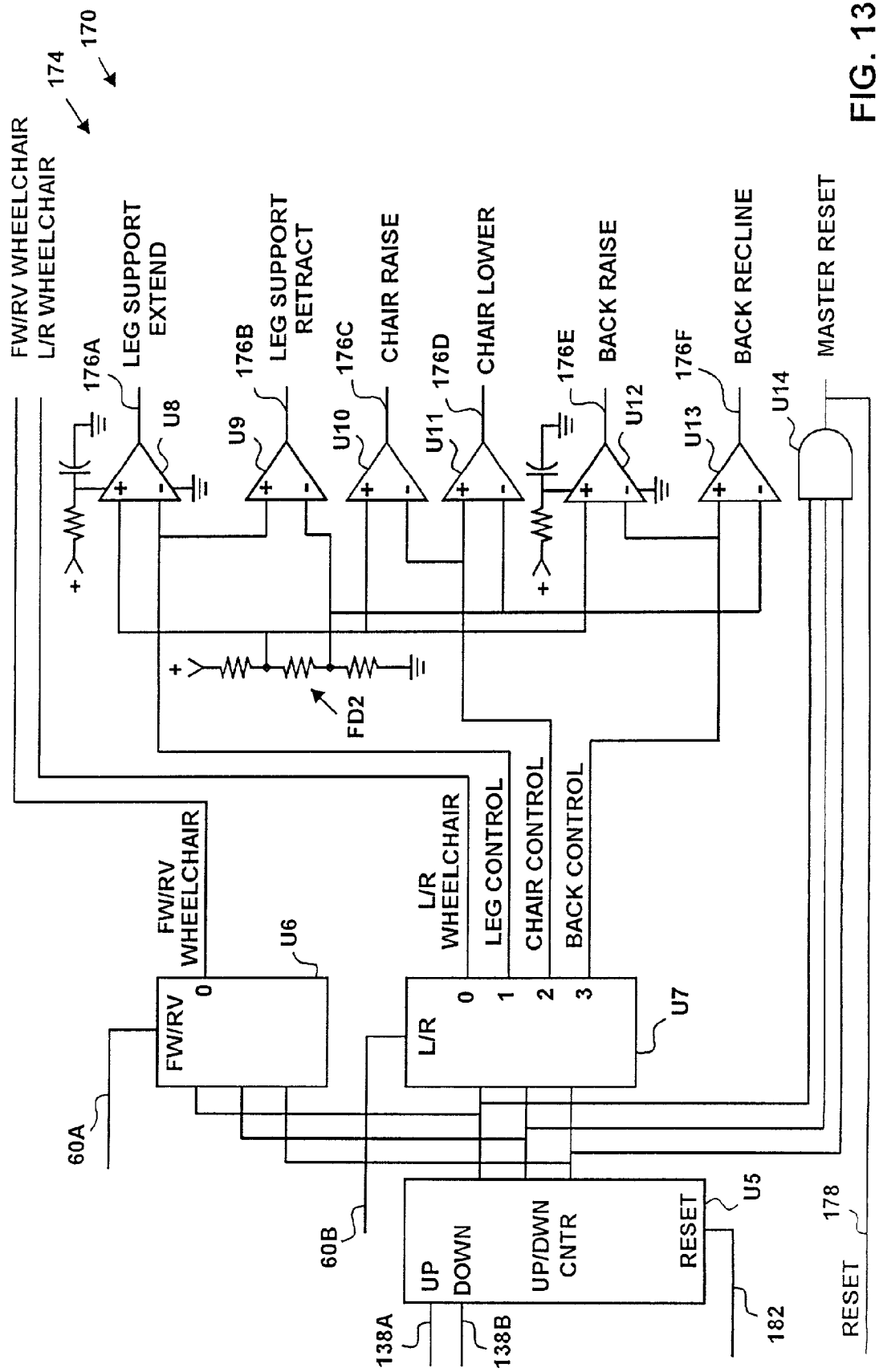
FIG. 13 is an other portion of the rate-of-change control device of FIG. 12.

Referring now to FIGS. 8, 12, and 13, a control system 170 includes the rate-of-change control device 132 of FIG. 8, a sync pattern detector, or timed-opportunity switch, 172 of FIG. 12, and an environmental control unit (ECU) 174 of FIG. 13.

Referring now to FIG. 13, the ECU 174 allows a person 20 of FIG. 1 to selectively control the wheelchair 12 of FIG. 1, to access control of any reasonable number of tasks, such as tasks 176A-176E of FIG. 13, and to control the tasks 176A-176E, such as the tasks, 176A and 176B, of extending and retracting leg supports, not shown, of the wheelchair 12.

Selection between control of the wheelchair 12 of FIG. 1 in a usual manner, such as by tilting the head 18 of FIG. 1, and selection of tasks 176A-176E to be controlled is achieved by UP and DOWN signals that are delivered to an incrementing UP/DOWN counter U5.

The UP and DOWN signals that are used to increment and decrement the UP/DOWN counter U5 preferably are those produced in the conductors 138A and 138B by the rate-of-change control device 132 of FIG. 8, as shown by the conductors 138A and 138B of FIG. 13. However, optionally, the UP and DOWN signals may be produced by any kind of switch that will produce momentary contacts.

In response to repeated ones of UP signals in the conductor 138A of FIG. 13, the UP/DOWN counter U5, increments, outputting 3 bits of digital information. Or, in response to DOWN signals, the UP/DOWN counter U5 decrements.

The digital information produced by the UP/DOWN counter U5 is connected, as shown, to two analog multiplexers, U6 and U7, both of which include outputs 0-7, not all outputs shown.

An input terminal FW/RV of the multiplexer U6 is connected to the forward/reverse propulsion signals in the Y-axis conductor 60A of FIG. 1, and an input terminal LUR of the multiplexer U7 is connected to the left/right turn signals in the X-axis conductor of FIG. 1.

Thus, the multiplexer U6 inputs and outputs voltages that are produced in the Y-axis conductor 60A by the tilt-axis X-Y input device 16 in response to movements of the head 18 forward and rearward, as shown in FIG. 1. In like manner, the multiplexer U7 inputs and outputs voltages that are produced in the X-axis conductor 60B by the tilt-axis input device 16 in response to movements of the head 18 to the left and to the right.

When the UP/DOWN counter U5 is indexed, by UP or DOWN signals, to a position wherein all three output bits are zeros, the multiplexer U6 is in a zero position and connects the Y-axis conductor 60A to the wheelchair 12. In like manner, the multiplexer U7 connects the Y-axis conductor 60 to the wheelchair 12. Thus, when the UP/DOWN counter U5 is in its zero input position, the wheelchair 12 of FIG. 1 is controlled by selective positioning of the head 18.

When the UP/DOWN counter U5 is indexed to any position other than the zero position, the forward/reverse voltages of the Y-axis conductor 60A are removed from the wheelchair 12, and turn-signal voltages of the X-axis conductor 60B also are removed from the wheelchair 12.

When, in response to UP or DOWN, the UP/DOWN counter U5 is indexed to other positions, control of a task, such as the task 176 becomes controllable through the multiplexer U7 in response to movements of the head 18 of FIG. 1 to the left or to the right.

That is, in response to left and right tilting of the head 18 of FIG. 1, turn signal voltages are produced, and these turn signal voltages are used to control selected ones of the tasks 176A-176F. More particularly, the turn-signal voltages and voltages from a fixed voltage divider FD2 are delivered to a selected one of comparators U8-U13, so that the comparators activate the selected task, 176A-176E.

Summarizing operation of the control system 170, as described thus far, selection between control of the wheelchair 12 of FIG. 1 and control of the tasks 176A-176E is made by momentary contact switching, which preferably is achieved by relatively rapid tilting of the head 18 of FIG. 1 in forward and reverse directions. And control of the selected task, 176A-176F, is made by left/right tilting of the head 18.

That is, control of the UP/DOWN counter U5, and selection of tasks, 176A-176E, by the multiplexer U6, is by momentary contact switching. Preferably, this momentary contact switching is achieved by relatively rapid forward and rearward tilting of the head 18 of FIG. 1, differentiation of the forward/reverse output voltage of the Y-axis conductor 60A of FIG. 1 by the differentiator 40A of FIG. 8, and momentary contact switching produced by the discriminator 134 of FIG. 8.

Escape from the ECU 174, and shut-down of the control system 170, is achieved by incrementing the UP/DOWN counter U5 to its maximum input, that is, to a position wherein all outputs are at a digital 1. With all outputs at a digital 1, all three inputs of an AND gate U14 are at a digital 1, so that a digital 1 output is produced in a reset conductor 178.

Referring now to FIG. 12, the sync pattern detector 172 responds to momentary contact switching that is produced by any means, or any type of switch. However, preferably, momentary contact switching is produced by the rate-of-change control device 132 of FIG. 8.

The sync pattern detector 172 requires a pattern of input signals that provides assurance that a person 20 of FIG. 1 is lucid, rather than being incapable of beneficial use of the control system, whether due to medication, any other reason.

More particularly, the sync pattern detector 172 requires relatively rapid tilting of the head 18 of FIG. 1, sequentially in forward, rearward, leftward, and rightward directions. In addition the sync detector requires that the person 18 refrain from tilting of the head 18 rapidly during periods that are interspersed between the required tiltings of the head 18.

To help the person 20 achieve successful activation of the system 170, a green light-emitting diode (LED) CR7 is illuminated when head tilting is required, and a red LED CR8 is illuminated when the person 20 must refrain rapid tilting of the head 18.

A clock/counter U15 is in a quiescent state when it is setting at a count of 8 wherein further counting is inhibited, all bistable multivibrators U16-U19 are reset, and the green LED CR7 is illuminated.

To initiate, or enable, the control system 170, the person 20 of FIG. 1 rapidly tilts the head 18 forward in a Y direction, producing a forward-propulsion output signal in the Y-axis conductor 60A, and thereby producing momentary-contact switching in the conductor 138A that is switched as a function of dy/dt.

This momentary contact switching in the conductor 138A, as applied to an AND gate U16, cooperates with a signal from the clock/counter U15 that is present when the clock/counter U15 is at the 8 count, to start the clock/counter U15 counting upwardly from zero at intervals that may be about one second.

A three-bit output of the clock/counter U15 is connected to an 8-way MUX, or decoder, U17 that sequentially delivers a digital output to AND gates U18-U21, and to four additional AND gates, not shown, same as AND gates U18-U21, but connected to the conductors 138C and 138D. Thus, in sequence, the AND gates U18-U21 are provided one of the signals that each AND gate, U18-21, requires to produce an output in one of the conductors generally labeled 180.

Each of the AND gates U18-U21 is connected to a respective one of bistable multivibrators U22-U24 by one of the conductors 180. As shown, Q outputs of the bistable multivibrators U22 and U24 are connected to an AND gate U26, and NOT Q outputs of the bistable multivibrators U23 and U25 also are connected to the AND gate U26.

Therefore, if inputs, produced by tilting the head 18 of FIG. 1, occur at prescribed time intervals and in the prescribed order of tilting, and if the head 18 is not tilted rapidly at intermediate time intervals, the AND gate U26 will be satisfied at the expiration of clocked time intervals, the AND gate U26 will produce an output in a conductor 182 of FIG. 12, thereby removing the reset input to the UP/DOWN counter U5 of FIG. 13, and initiating control of the ECU 174 over the wheelchair 12 of FIG. 1 and the tasks 176A-176E of FIG. 13.

As mentioned previously, the green LED CR7 and the red LED CR8 indicates times when signals must be inputted into the sync pattern detector 172, and times when signals must not be inputted into the sync pattern detector 172. The green LED CR7 and the red CR8 are illuminated in accordance with sequential outputs of the decoder U17 and OR gates U27 and U28.

While only Y-axis components of the sync pattern detector 172 have been shown, the conductors 138C and 138D of FIGS. 8 and 12, together with Q and NOT Q signals of FIG. 12 for LEFT and RIGHT signals, make it abundantly clear that four more AND gates and four more bistable multivibrators, neither shown, can be added to make the sync pattern detector 172 require four sequential movements of the head 18 in the order described with NOT Q outputs interposed.

Figure 14:
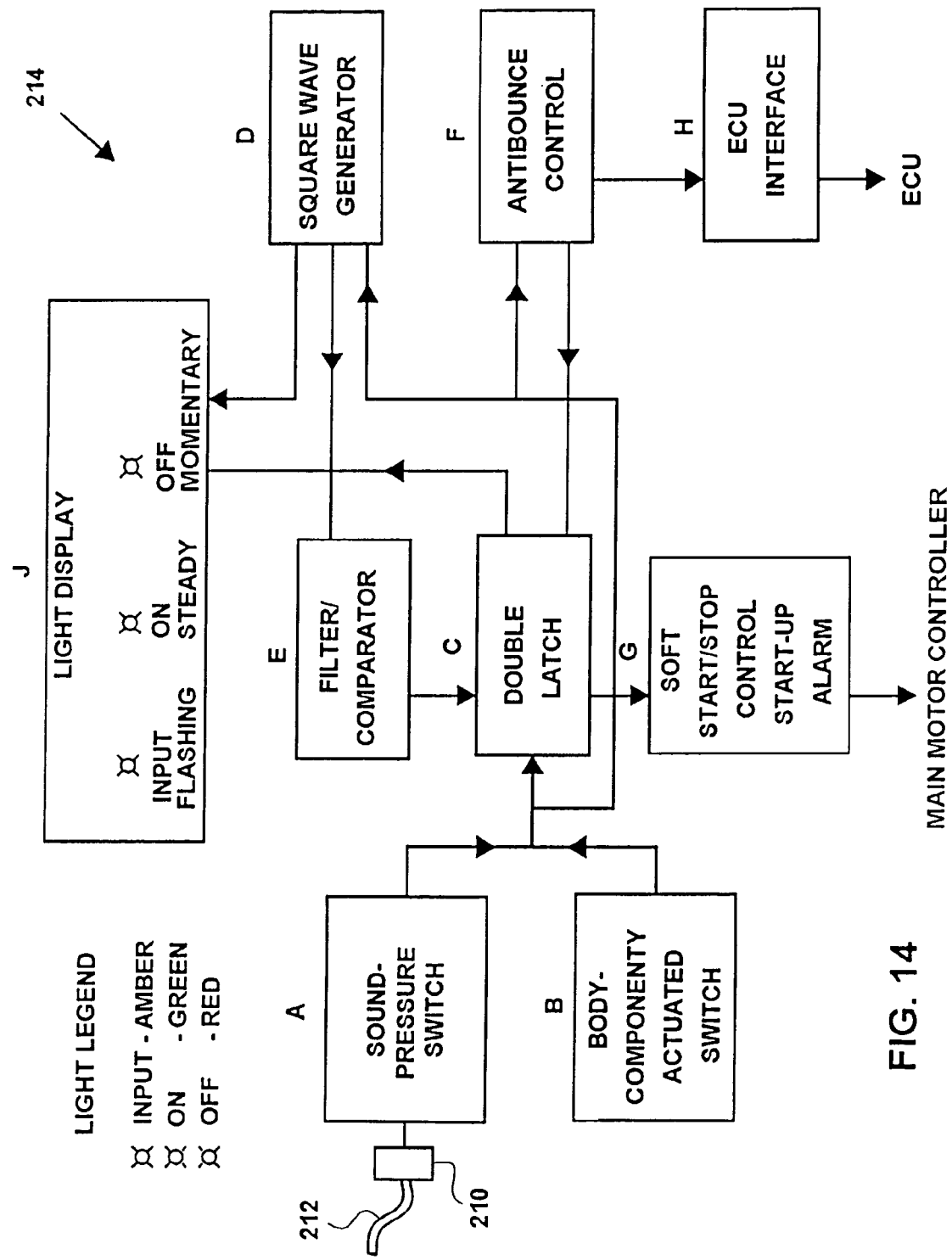
FIG. 14 is a block diagram of a timed-opportunity switch, including a sound-pressure switch that is used as an input device, and including an ECU interface for connection to the ECU of FIG. 17.

Referring now to FIG. 14, sound-pressure waves produced by speaking, blowing, whistling, or saying "ah" into a microphone 210 through a microphone tube 212 actuate a sound-pressure switch of a Block A, thereby controlling a timed-opportunity switch 214 of FIG. 14. The sound-pressure switch of the Block A, by actuating contacts therein, produces command signals, as will be shown and described subsequently.

The sound-pressure switch of block A includes two discriminating adjustments. The first adjustment is microphone gain, and it can be varied to be compatible with the user's ability to speak, make sounds, or make blowing noises. The second adjustment reduces the possibility of ambient noises switching the circuit and allows for the user's audio to be distinguished above ambient or background noises.

Block B is a body-component-actuated switch. That is, the body-component switch is any type of switch, including push button, touch membrane, proximity sensors, or tilt sensors, that can be actuated by a handicapped person by any one of his body parts.

A command signal from either the sound-pressure switch of block A or the body-component-actuated switch of block B is fed into a double-latch of block C.

The double-latch of block C requires two selectively timed command signals to proceed with the turn-on procedure. If either command signal exceeds its allotted time, or if the second command signal occurs at the wrong time, the turn-on process will default and, after a short pause, the user can try again, starting with the first command signal. Following a double latch, the double-latch of block C provides a steady-state signal to a light display of block J, indicating that double latch has occurred and the timed-opportunity switch has turned on.

Referring now to a rectangular-wave generator of block D, the first command signal activates the rectangular-wave generator and provides a rectangular wave that is supplied to a filter/comparator of block E. The rectangular wave will cease to operate after approximately two seconds unless a second command signal is received in the filter/comparator of block E in a predetermined, and selectively adjusted, window of opportunity, or time space.

That is, the rectangular wave starts with a low at the instant of receiving the first command signal, and the second command signal must be received by the filter/comparator of block E during the next successive low of the rectangular wave, or the system will default to standby. Further, if any part of this second command signal occurs during the preceding or succeeding high of the rectangular wave, the system will shut down.

To accommodate individual user's mental capabilities and motor skills, and thereby reduce the possibility of an accidental turn-on of the power wheelchair, the duty cycle and repetition rate, or period, of the rectangular-wave generator can be selectively and independently varied.

Referring now to block E, the filter/comparator compares the first and second command signals for allotted duration and time interval by comparing with a time-base rectangular-wave signal received from the rectangular-wave generator of block D. Both first and second command signals are compared and accepted or rejected on this time-base comparison. Any rejection results in total default of the start-up procedure.

Referring now to block F, an antibounce control provides sequencing for all timed-opportunity switch functions. It also contains circuitry to prevent acceptance of double clicking commands produced during the period provided for the first command signal. When the antibounce control of block F receives two consecutive and acceptably-timed signals from either the sound-pressure switch of block A or the body-component-actuated switch of block B, it outputs a signal to a soft start-stop control of block G that also includes a start-up alarm.

Referring now to block G, the soft start-stop control of block G provides for activation of a power wheelchair controller, not shown, not a part of the present invention, and assures a soft start regardless of the position of the input sensors, such as those included in a joystick or the eyeglass control unit of the aforesaid Lautzenhiser et al. patent application, not shown, not a part of the present invention.

The start-up alarm of block G provides an audible warning of a selectible one to five chimes to alert the user that a successful turn-on has occurred and at the end of the one-to-five-chime warning, the wheelchair will become operational.

As stated previously, normal wheelchair turn-on requires two successfully timed command signals, followed by an audible warning, which consists of preselected one to five chimes. These chimes will occur prior to the time the wheelchair controller becomes operational by applying a signal to the main motor controller.

Anytime after the timed-opportunity switch makes a main controller (not shown) of a handicapped apparatus (not shown) operational, a third command signal, received at the double latch of block C from either the sound-pressure switch of block A, or the body-component-actuated switch of block B, will result in shutdown of the main motor controller. In addition, the soft start/stop switch of block G provides for a soft stop if the user is moving when his third command signal initiates a shutdown. Redundancy circuits provide an enabling signal that activates prior to start and a second emergency shutdown signal activates immediately following the time provided for soft stop.

However, this same third command signal, if received during the time of the audible warning, will have an entirely different result. It will activate an ECU interface of block H. The ECU interface of block H allows the user to access an environmental control unit (ECU), or multiplexer, of FIG. 17, and thereby to perform peripheral operations in response to selective actuation of the sound-pressure switch of block A of FIG. 14, the body-component-actuated switch of block B, or any other user-actuated switch or transducer.

The ECU interface of block H provides for a six second window of opportunity. If the ECU interface of block H receives a command signal from block A or block B during the one-to-five second start-up warning, the ECU interface will latch active and provide a source of power to the ECU of FIG. 17. This latch state will continue until the antibounce control of block F receives two acceptable signals, such as start-up signals, or the ECU interface of block H receives a shutdown signal from the ECU of FIG. 17.

Figure 17:
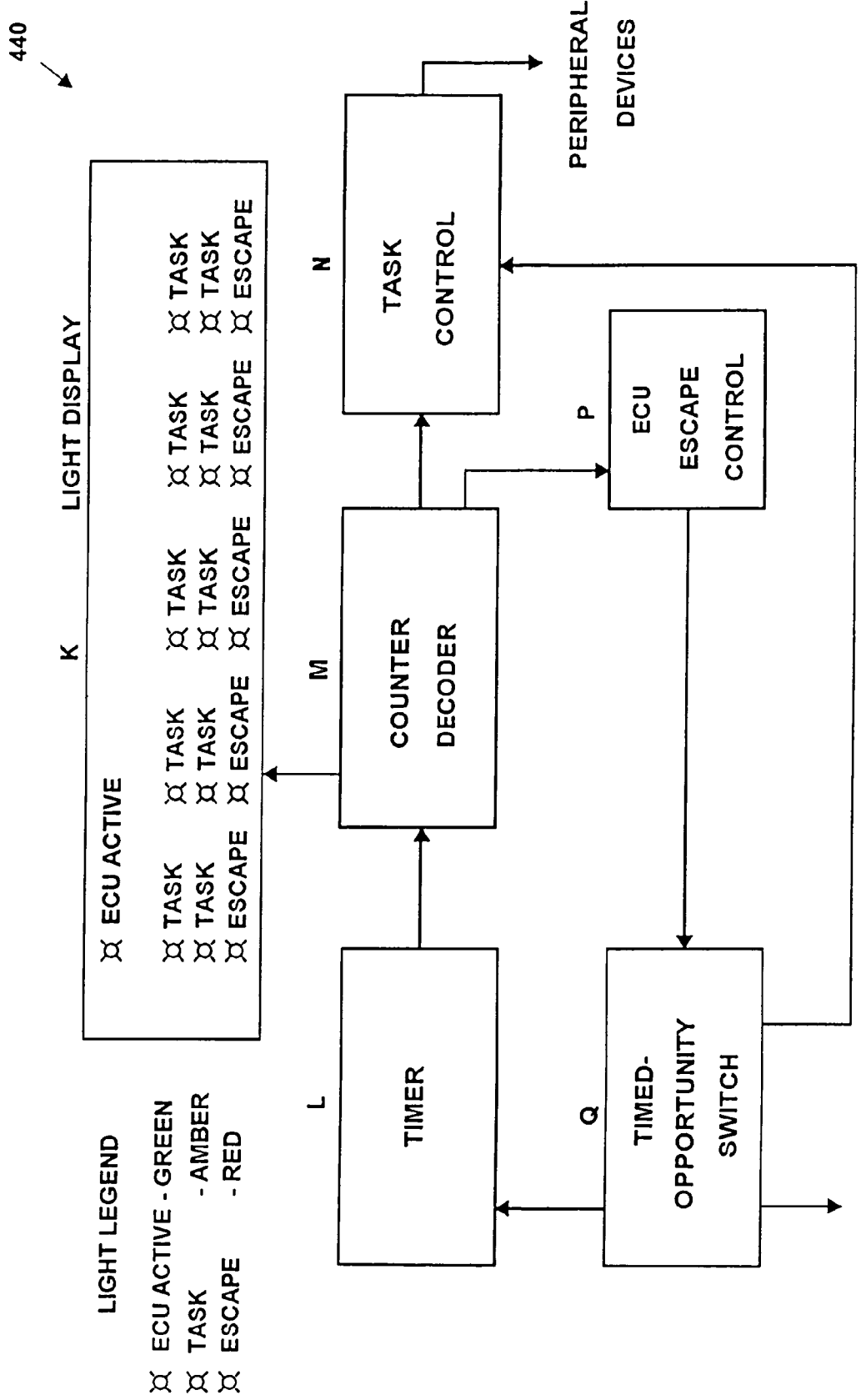
FIG. 17 is a block diagram of the ECU interface, showing the timed-opportunity switch of FIG. 14 as block Q of FIG. 17.

That is, to activate the ECU of FIG. 17 through the ECU interface of block H, the user inputs two successfully-timed command signals like those required for controller turn-on. A third command signal during the selectible one-to-five chime period will interrupt the controller start-up procedure and will cause the ECU interface of block H to activate the ECU of FIG. 17.

Once activated, the ECU of FIG. 17 is a cascading device and can be switched with sound-pressure signals from block A or mechanical command signals from block B to perform electrically-controlled or electrically-powered tasks or functions. A command signal from block A or block B can also activate the escape from, and shutdown of, the ECU of FIG. 17.

Block J of FIG. 14 is a three-light display that continuously displays the status of the timed-opportunity switch of FIG. 14. The first light illuminates when the first command signal is received from either block A or block B, and this first light thereafter flashes in concert with the repetition rate and duty cycle of the rectangular-wave generator. Flashing of this first light indicates the low of the rectangular wave which is the time of acceptance for the second turn-on signal, or command signal.

The second light of block J indicates that the timed-opportunity switch of FIG. 14 is turned on, and this second light is illuminated continuously during the active, or turned-on condition of the timed-opportunity switch. The third light, when illuminated momentarily, indicates that a system shutdown signal has been received, and that the timed-opportunity switch is being shut down.

The ECU of FIG. 17 is an optional and modular device that can be controlled by the sound-pressure switch of block A and/or the body-component-actuated switch of block B, both of FIG. 14. The ECU allows a power wheelchair user to control up to ten peripheral devices by using switching procedures similar to those required to turn on or turn off the main motor controller (not shown).

Optionally, the ECU of FIG. 17 may be used as a bedside or chairside unit to operate electrically controlled or electronically controlled devices. The switching operation of the sound-pressure switch of block A, FIG. 14, may be replaced by any type of switch that can be actuated by any body component, and the resultant command signal used to control the ECU of FIG. 17.

Referring now to FIGS. 14 and 17, block Q of FIG. 17 represents the entire timed-opportunity switch of FIG. 14. Command signals from the timed-opportunity switch of FIG. 14, that is, block Q of FIG. 17, selectively in initiates access to the ECU of FIG. 17.

Command signals from either the sound-pressure switch of block A of FIG. 14, or the body-component-actuated switch of block B, are used to choose tasks to be accomplished and to selectively choose the time to exit the ECU of FIG. 17.

The ECU of FIG. 17 controls up to ten tasks that require either momentary or continuous power without polarity change in response to an appropriately timed command signal from block A or block B of FIG. 14. Or, the ECU, controls up to five reversing motor operations.

Opportunities to use the ECU to control any of these ten switching operations are indicated by successive pairs of sequentially flashing lights on a light display of block K. An escape opportunity is interposed intermediate of successive pairs of sequentially flashing lights wherein the ECU shuts down in response to an appropriately-timed command signal from block A or block B of FIG. 14.

Referring now to a light display of block K in FIG. 17, following illumination of the "ECU active" light, the remaining lights cascade, displaying task, task-escape, task, task-escape, etc. Following display of the final escape light, the entire sequence repeats, starting with the "ECU active" light. This sequencing of the lights continues until an escape signal is received from either block A or block B of FIG. 14 during the illumination of an escape light of FIG. 17.

Continuing to refer to FIG. 17, block L is a timing circuit designed to output a selective six to twenty signals per minute. These signals function as clock signals for a counter in a block M. The counter in block M is coupled to a sixteen step decoder, also in block M, which provides a cascading output. The output of the sixteen step decoder in block M serves three functions.

First, output from the sixteen step decoder of block M provides signals to the block K which is known as the light display block. One of these signals momentarily illuminates the "ECU active" light when the ECU becomes active. The remaining fifteen outputs of the sixteen step decoder of block M are divided into two groups. Ten outputs are fed into a block N, known as the task control, and the remaining five outputs are fed into a block P which is the escape control, or ECU shutdown control.

Block N provides ten selectible independent contact closures, or five paired contact closures with motor-reversing capability, or any combination thereof. During one cycle of cascading signals, block P provides five sequential opportunities to escape or shut down the ECU.

Block K sequentially displays the remaining positions of the cascading decoder, showing which task would be performed or whether a shutdown of the ECU would occur as a result of a command signal originating at either lock A or block B of FIG. 14.

Referring now to FIGS. 15A-15G, these seven figures combine to provide a complete schematic drawing of a timed-opportunity switch 214 which is shown in block diagram form in FIG. 14.

Figure 15A:
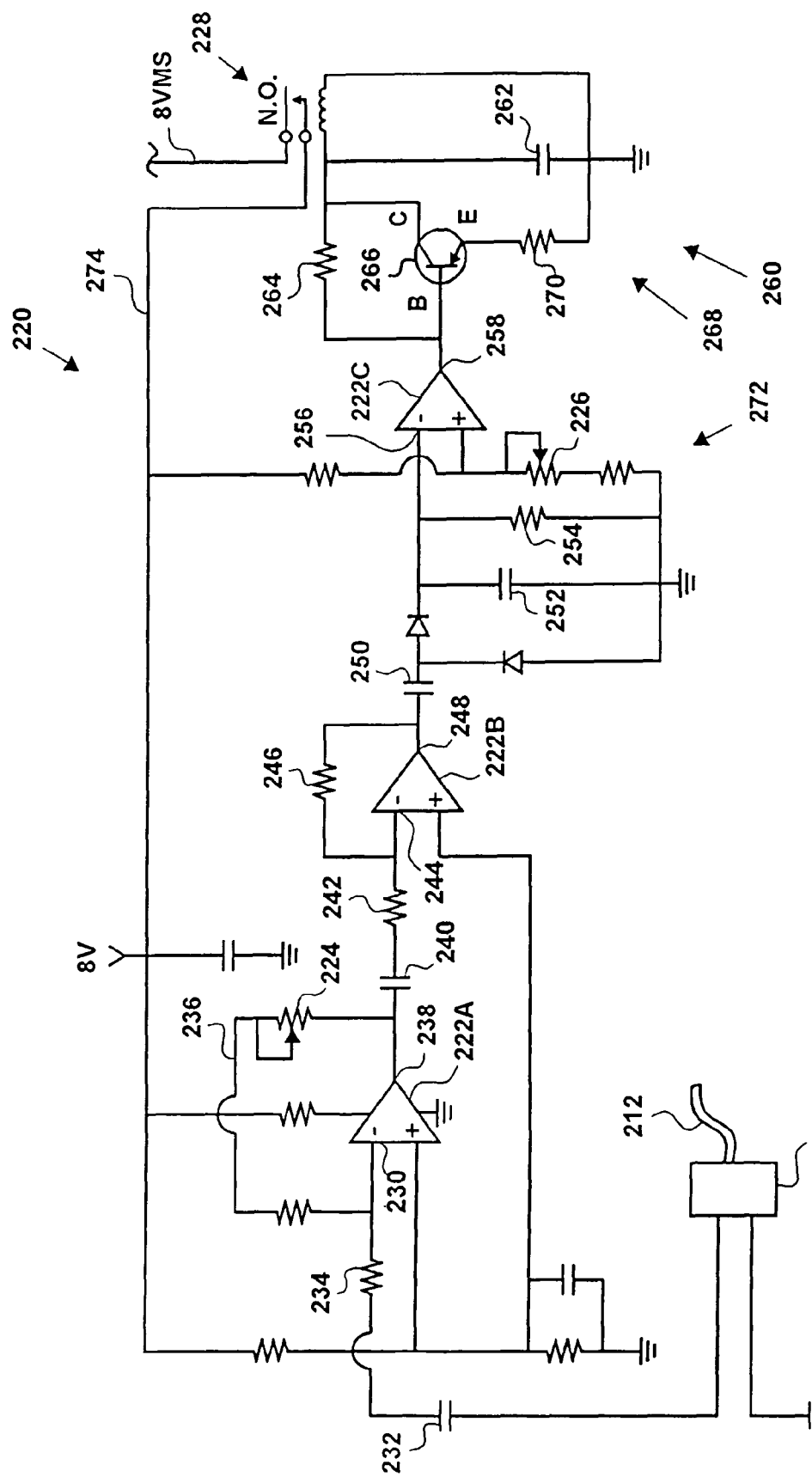
FIG. 15A is a schematic drawing of the sound-pressure switch of block A of FIG. 14.

Referring now to FIG. 15A, the microphone 210, with the microphone tube 212, are connected to a sound-pressure switch 220 of the timed-opportunity switch 214 of FIG. 14. The sound-pressure switch 220 includes operational amplifiers 222A, 222B, and 222C, a microphone-gain potentiometer 224, an ambient noise offset potentiometer 226, and a normally-open relay 228.

A sound originating from the microphone 210 is delivered to a negative input 230 of the operational amplifier 222A via a capacitor 232 and a resistor 234 as an electrical signal, the electrical signal from the microphone 210 is amplified in the operational amplifier 222A in accordance with selective adjustment of the microphone-gain potentiometer 224 which is in a feedback path 236 of the operational amplifier 222A.

Output from an output terminal 238 of the operational amplifier 222A is conditioned by a capacitor 240 and an input resistor 242 and delivered to a negative input terminal 244 of the operational amplifier 222B wherein the microphone signal is further amplified in accordance with the ratio of the input resistor 242 and a feedback resistor 246.

Output from an output terminal 248 of the operational amplifier 222B is conditioned by a capacitor 250, a capacitor 252, and a resistor 254, and then delivered to a positive input terminal 256 of the operational amplifier 222C.

The operational amplifier 222C functions as a comparator, switching an output terminal 258 from a low to a high when sound-pressure waves are detected. An RC circuit 260, that includes a capacitor 262 and a resistor 264, buffers instantaneous signals from the output terminal 258 of the operational amplifier 222C.

That is, the RC circuit 260 prevents instantaneous or sharp noises, such as are made by a falling object colliding with a hard surface, from closing the normally-open relay 228.

A transistor 266 is in a bootstrap circuit 268 with the capacitor 262 and a resistor 270. The transistor 266, the capacitor 262, and the resistor 270 cooperate to rapidly reduce charges on the capacitor 262 in preparation for the next sound-pressure signal from the microphone 210.

Finally, the potentiometer 226 is in a reference voltage circuit 272 of the operational amplifier 222C, so that selective adjustment of the potentiometer 226 selectively adjusts a threshold noise level of the microphone 210.

In accordance with the preceding description of operation, the sound-pressure switch 220, which includes the normally-open relay 228, provides means for activating a switching function in response to a user (not shown), blowing into the microphone tube 212, or a user speaking into the microphone tube 212. Further, as previously described, the microphone-gain potentiometer 224, provides means for selectively determining the pressure level that closes the normally-open relay 228. That is, whether a user (not shown) blows into the microphone tube 212 or speaks into the microphone tube 212, a pressure wave is produced.

As previously described, the potentiometer 226 provides means for selectively adjusting an ambient noise level that the sound-pressure switch 220 will ignore, and the RC circuit 260 prevents accidental actuation of the sound-pressure switch 220 by such things as doors being slammed or objects being dropped.

Closing of the normally-open relay 228 momentarily supplies 8 volts from a regulated power supply (not shown, not an inventive part of the present invention), that is connected to a conductor 274 as shown, and through the normally-open relay 228 to a conductor 8 volts momentarily switched (8 VMS).

Alternately, a user-actuated switch, or body-component-actuated switch, 278, that is shown schematically as a part of a double-latch 280 of FIG. 15A, may be used instead of the sound-pressure switch 220 of FIG. 15A to provide 8 VMS to the double-latch 280, or to any other circuit that uses 8 VMS.

Figure 15B:
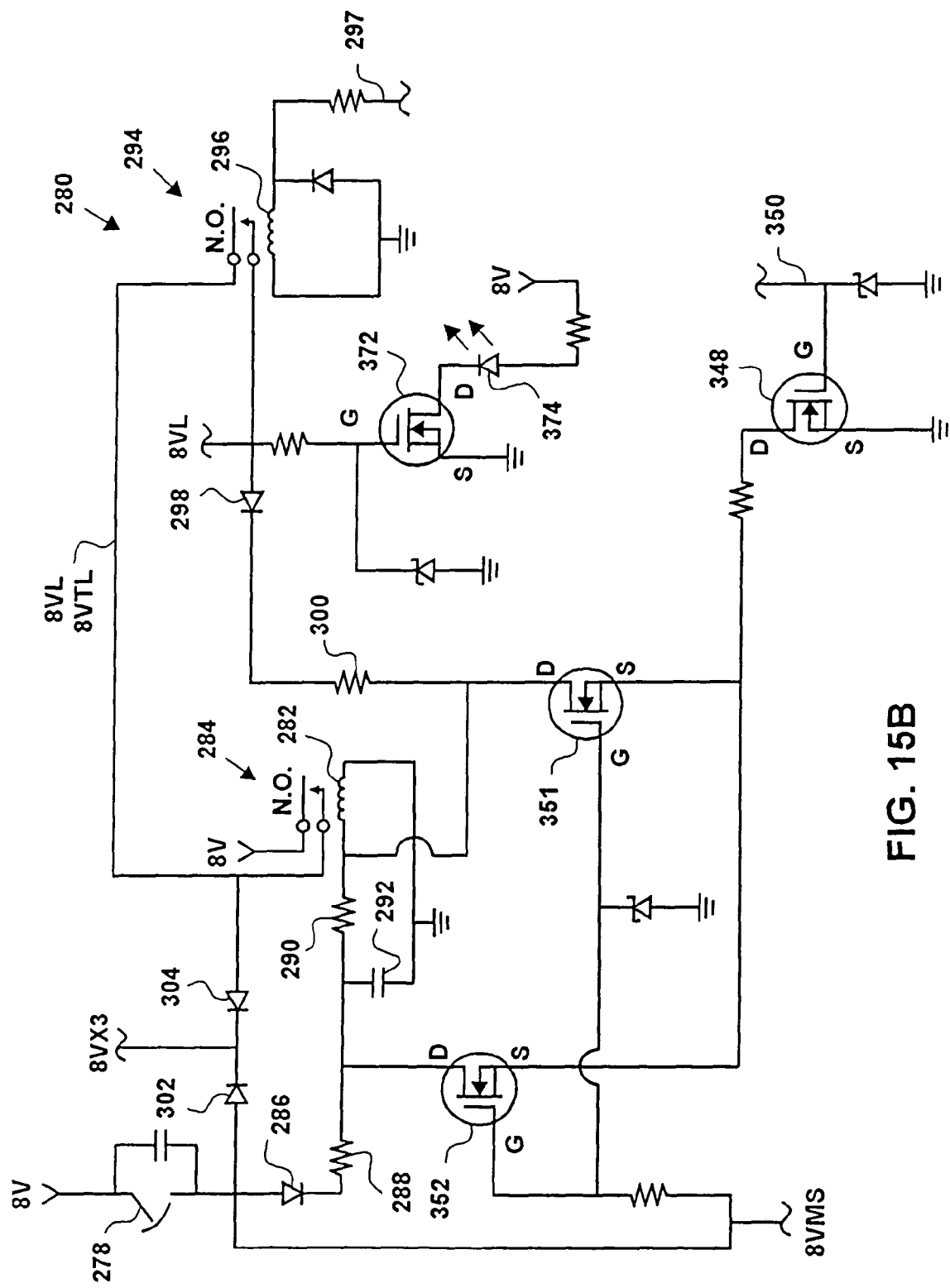
FIG. 15B is a schematic drawing of the double-latch of block C of FIG. 14.

8 VMS indicates that potential from an 8 volt regulated power supply is momentarily connected, by momentary closure of the normally-open relay 228 of FIG. 15A, or by the momentary closure of switch 278 of FIG. 15B to any conductor 8 VMS. Therefore, anywhere in FIGS. 15B-15G, a conductor 8 VMS includes an 8 volt potential which is present whenever the sound-pressure switch 220 is closed by microphone actuation or by any other user actuation of any kind of switch.

Referring now to FIGS. 15A and 15B, closing of the normally-open relay 228 in the sound-pressure switch 220, delivers 8 VMS to the double-latch 280 of FIG. 15B via the conductor 8 VMS.

The first command signal sent from the sound-pressure switch 220 of FIG. 14 to the double-latch 280 of FIG. 15 delivers a pulse of 8 volts to a coil 282 of a normally-open relay 284 via a diode 286, a resistor 288, and a resistor 290, thereby supplying a voltage to the coil 282 and closing the relay 284. The voltage delivered to the coil 282 also charges a capacitor 292. The charge in the capacitor 292 continues to apply a voltage to the coil 282 until the capacitor 292 is discharged by the resistor 290, thereby holding the relay 284 closed and providing a timed latching of the relay 284 for approximately 2 seconds. Since, the relay 284 is held closed for two seconds, instead of supplying 8 VMS, it provides 8 volts time latched (8 VTL).

A conductor 8 VTL that is connected to the relay 284 indicates that this conductor has an 8 volt potential that is time-latched for approximately two seconds by the relay 284 following 8 VMS being applied to the coil 282 of the relay 284 and to the capacitor 292.

Any conductor in any of the drawings that is labeled 8 VTL means that an 8 volt potential exists for approximately two seconds following an 8 volt momentarily switched 8 VMS potential produced by sound-pressure closing of the normally-open relay 228 of FIG. 15A or closing of the switch 278 of FIG. 15B.

Further, since actuation of the sound-pressure switch 220 of FIG. 15A (block A of FIG. 14), closing of the switch 278 of FIG. 15B (block B or FIG. 14), or user actuation of any suitable switch or transducer produces 8 VMS, a command signal delivered to any of the circuits shown and described herein is in the form of 8 VMS, and labeling a conductor 8 VMS indicates that 8 VMS is in that conductor whenever any kind of user-actuated switch is closed to provide a command signal.

Continuing to refer to the double-latch 280 of FIG. 15B (block C of FIG. 14), a normally-open relay 294 is connected to the coil 282 of the relay 284. The purpose of the relay 284, which is time-latched by the capacitor 292, is to supply 8 volts from a regulated power supply to the conductor 8 VTL.

The purpose of the normally-open relay 294 is to latch the relay 284. That is, when a coil 296 of the normally-open relay 294 is energized and the normally-open relay 294 closes, 8 VTL is delivered to the coil 282 of the relay 284 via a diode 298 and a resistor 300 latching the relay 284 closed until an actuating potential is removed from the coil 296. The coil 296 is connected to 8 VX3 by a conductor 297, as will subsequently be described in conjunction with FIG. 15E.

Therefore, whenever the coil 296 of the normally-open relay 294 is energized, an 8 volt latched potential exists in the conductor 8 VTL, and this conductor can also be labeled 8 volts latched (8 VL).

A conductor 8 VX3 receives 8 VMS via a diode 302, the conductor 8 VX3 receives both 8 VTL and 8 VL via a diode 304. 8 VX3 indicates that the conductor 8 VX3 receives 8 volt potentials that exist under three different conditions and for three different periods of time.

In a first of these three conditions, an 8 volt potential is momentarily switched by a user-actuated switch such as the sound-pressure switch 220, in a second condition an 8 volt potential is time-latched for approximately two seconds, and in the third condition an 8 volt potential remains latched on until the normally-open relay 294 is opened under conditions that will be described subsequently.

Figure 15C:
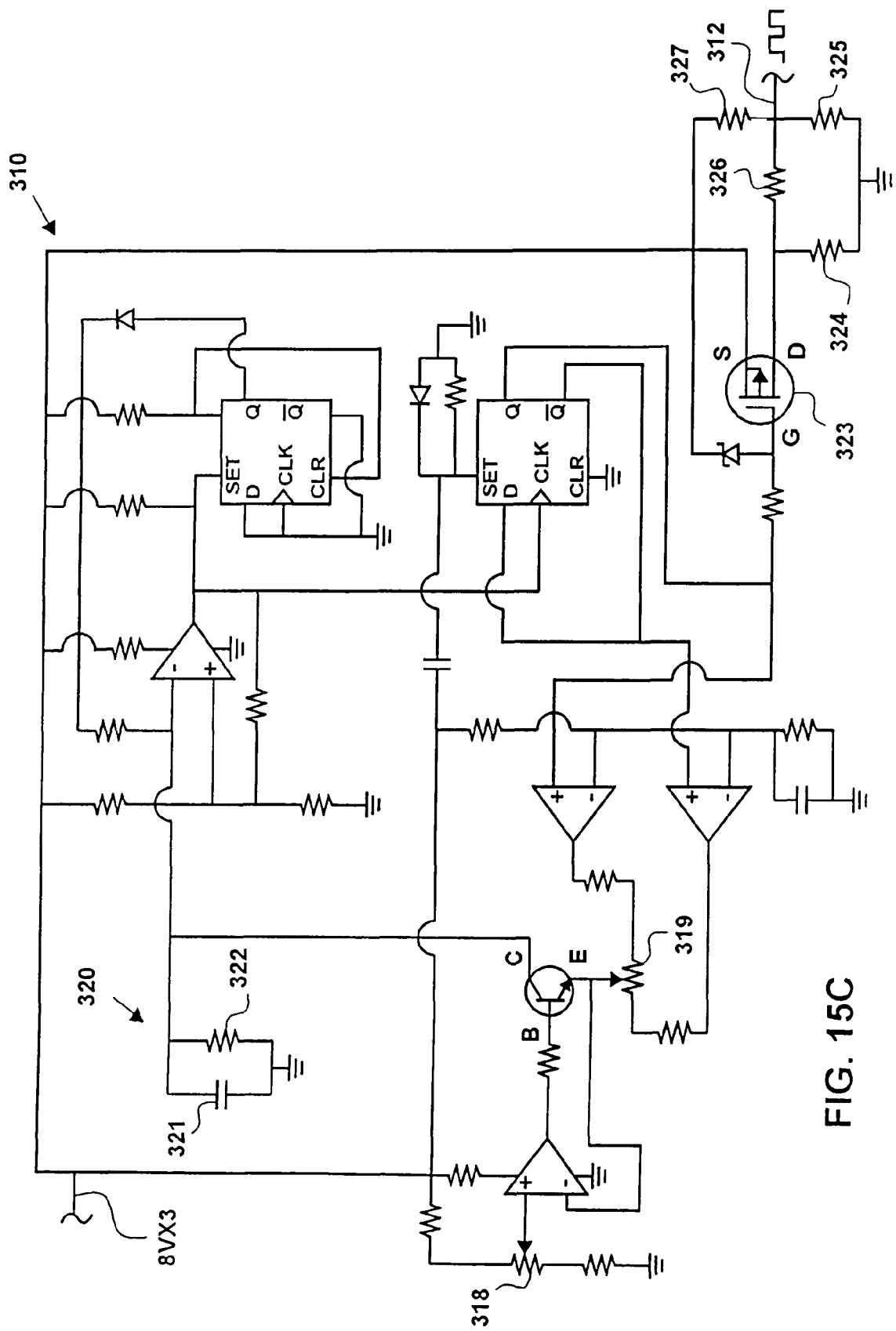
FIG. 15C is a schematic drawing of the rectangular-wave generator of block D of FIG. 14.
Figures 15D, 16:
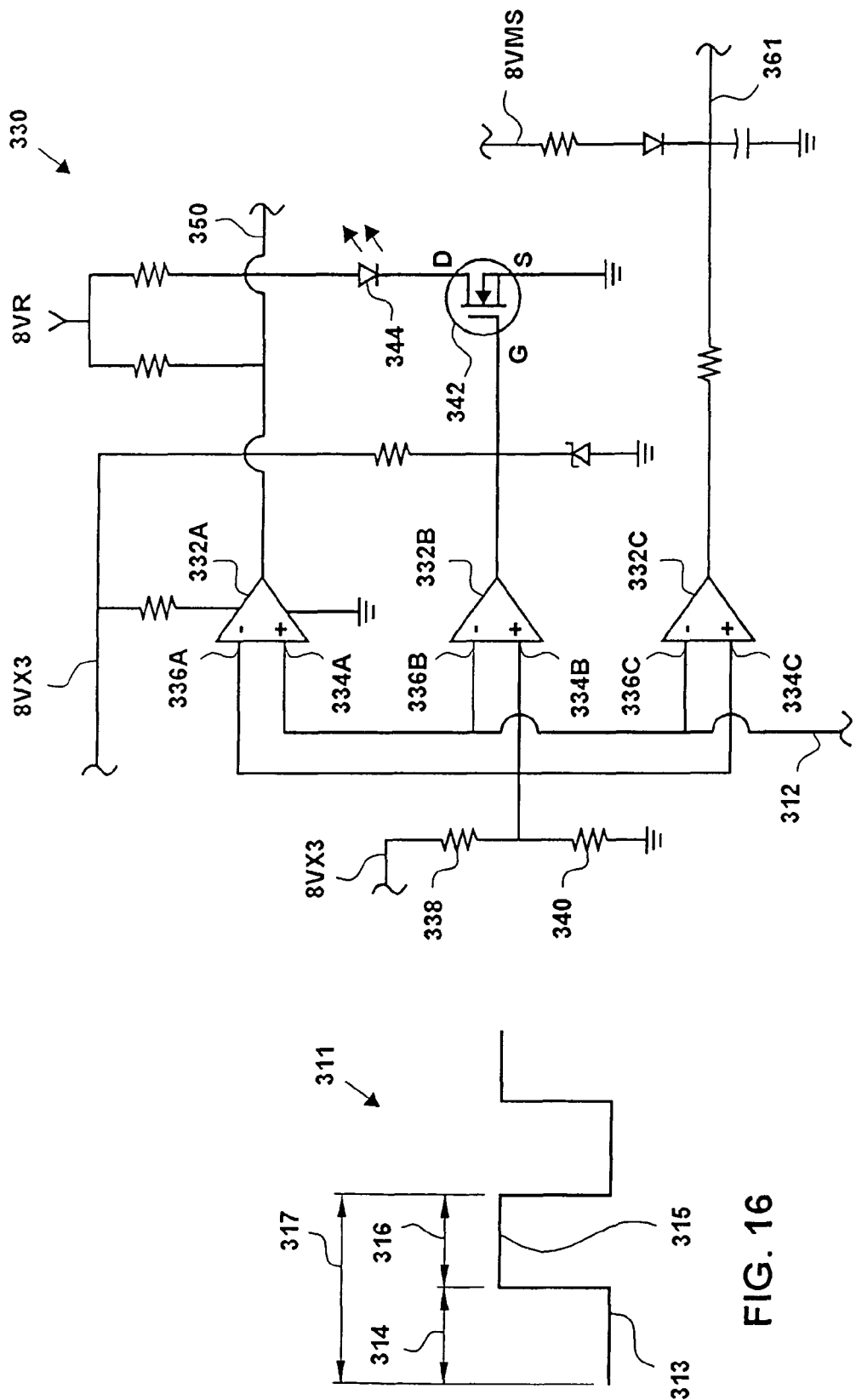
FIG. 15D is a schematic drawing of the filter/comparator of block E of FIG. 14.
FIG. 16 is a graph of the rectangular wave that is produced by the rectangular-wave generator of FIG. 15B.

Referring now to FIG. 15C (block D of FIG. 14), the 8 volt potential that is momentarily switched 8 VMS by the sound-pressure switch 220 will start a function generator, or rectangular-wave generator 310, the 8 volt potential that is temporarily latched 8 VTL will continue to power the rectangular-wave generator 310, and a rectangular 311 of FIG. 16 will output at a conductor 312 of FIG. 15C.

Referring now to FIG. 16, the rectangular wave 311 starts with a low 313 whose duration 314 preferably lasts for less than 1 second, and then changes abruptly to a high 315 whose duration 316 preferably lasts for less than 1 second, thereby providing a rectangular wave whose period 317 is approximately two seconds.

Referring now to FIGS. 15C and 16, the rectangular-wave generator 310 includes a potentiometer 318 that is effective to change the period 317, and the rectangular-wave generator 310 includes a potentiometer 319 that is effective to proportion lows 313 to highs 315 without changing the periods 317.

The rectangular-wave generator 310 is similar to a rectangular-wave generator shown and described in *Electronic Design* magazine of 24 Jan. 1994 except for correction herein of an inadvertent error in the schematic shown in the aforesaid magazine article, and except as follows.

An RC circuit 320, that includes a capacitor 321 and a resistor 322 was modified to slow the repetition rate. A field-effect transistor (FET) 323 was added to invert the rectangular wave 311. Resistors 324, 325, 326, and 327 were added to condition the rectangular wave 311 to be less than a rail-to-rail output for comparator comparability.

Referring now to FIG. 15D (block E of FIG. 14), a filter/comparator 330 includes comparators 332A, 332B, and 332C. The rectangular-wave generator 310 delivers the rectangular wave 311 to a positive terminal 334A of the comparator 332A, to a negative terminal 336B of the comparator 332B, and to a negative terminal 336C of the comparator 332C via the conductor 312.

A negative terminal 336A of the comparator 332A, a positive terminal 334B of the comparator 332B, and a positive terminal 334C of the comparator 332C are biased to a voltage that is intermediate of 8 volts and ground by a voltage divider that includes a resistor 338 and a resistor 340, and that is connected to the conductor 8 VX3.

The comparator 332B cooperates with a field-effect transistor (FET) 342, a yellow light-emitting diode (LED) 344, and other components as shown, to provide a light that flashes during each low 313 of the rectangular wave 311 of FIG. 16. Periodic flashing of the LED 344 indicates a window of opportunity for acceptance of a command signal 8 VMS from the sound-pressure switch 220, or from any other user-actuated switch, that will latch the normally-open relay 294 of the double-latch 280 of FIG. 15B.

That is, in response to a first command signal 8 VMS from the sound-pressure switch 220 of FIG. 15A, the rectangular-wave generator 310 of FIG. 15C starts by producing the low 313. In response, the relay 284 and the capacitor 292 provide a time latch of approximately two seconds, so that the rectangular-wave generator 310 receives 8 VTL for approximately two seconds, and the rectangular wave 311 continues for this time duration.

To latch the normally-open relay 294 of the double-latch 280 of FIG. 15B a second command signal 8 VMS must be received by the double-latch 280 that is disposed entirely within the second low 313 of the rectangular wave 311 of FIG. 16.

A command signal 8 VMS that starts during the high that precedes the second low 313 of the rectangular wave 311 of FIG. 16, whether or not it continues into the second low 313, will default the timed-opportunity switch 214 back to its standby condition.

In like manner, a command signal 8 VMS that starts during the window of opportunity of the second low 313 of the rectangular wave 311 will default the timed-opportunity switch 214 back to the standby condition if this second command signal extends into any part of the following high 315.

That is, the comparator 332A will reject any command signal 8 VMS from the sound-pressure switch 220 or the body-component-actuated switch 278 that is not disposed entirely within the low 313 of the rectangular wave 311 of FIG. 16.

In addition to rejecting a command signal 8 VMS that is not disposed entirely within the second low 313 of the rectangular wave 311, the comparator 332A causes the start-up sequence to default by interrupting power to the coil 282 of the relay 284, thereby shutting down the timed-opportunity switch 214 of FIGS. 14 and 15B-15F, and returning the timed-opportunity switch 214 to its standby condition.

Referring now to the double-latch 280 of FIG. 15B and to the filter/comparator 330 of FIG. 15D, an output terminal 346 of the comparator 332A of FIG. 15D is connected to the gate of a field-effect transistor (FET) 348 of FIG. 15B by a conductor 350. The comparator 332A interrupts power to the coils 282 and 296 of the relays 284 and 294 of FIG. 15B by switching the FET 348 of FIG. 15B to a conducting state, thereby grounding the source terminals of field-effect transistors (FETS) 351 and 352 of FIG. 15B.

A command signal 8 VMS from the sound-pressure switch 220, the body-component-actuated switch 278, or any other user-actuated switch, signals the gates of the FETS 348 and 351, and switches the FETS 348 and 351 to their respective conducting states, totally discharging the capacitor 292 and the coil 282 through the FETS 348 and 351. This unlatches the relay 284 resulting in the timed-opportunity switch 214 returning to the shutdown and standby state.

Figure 15E:
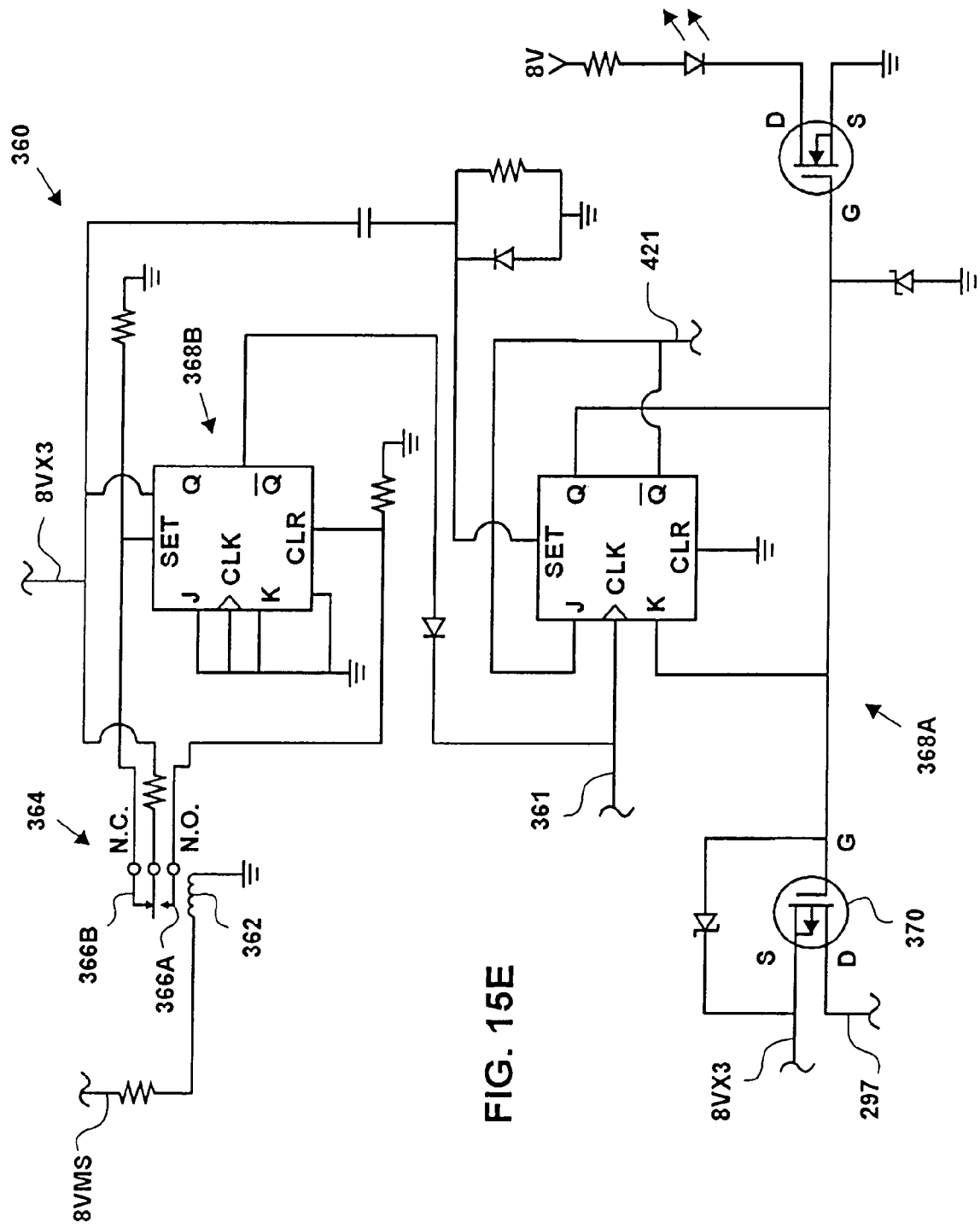
FIG. 15E is a schematic drawing of the antibounce control of block F of FIG. 14.

Referring now to FIGS. 15D and 15E, the comparator 332C of FIG. 15D is connected to an antibounce control 360 of FIG. 15E (block F of FIG. 14) by a conductor 361. The comparator 332C cooperates with the antibounce control 360 to accomplish one of two functions. If a second command signal is received entirely within the low 313 of the rectangular wave 311 that follows the first high, the timed-opportunity switch 214 of FIGS. 15B-15F will turn on. However, if the user double-clicks either the sound-pressure switch 220 of FIG. 15A or a body-component-actuated switch 278 of FIG. 15B, the timed-opportunity switch 214 will only recognize the first command signal received during a window of opportunity.

That is, if the user blows into the microphone tube 212 twice at close intervals, if he speaks two words into the microphone, or if he actuates the body-component-actuated switch 278 of FIG. 15B twice at close intervals, producing two closely-spaced command signals, the first of these two command signals will start the rectangular-wave generator 310 of FIG. 15C, and the second of these two command signals will occur while the rectangular-wave generator 310 is still producing its first low 313, as shown in FIG. 15. As used here, this is the meaning of "double clicking." Additionally if double clicking occurs during the second window of opportunity, only the first command signal will be recognized.

Continuing to refer to the comparator 332C of FIG. 15D and to the antibounce control 360 of FIG. 15E, successful start-up, proceeds as follows: when a user provides a first command signal, as by use of the sound-pressure switch 220, this first command signal 8 VMS is delivered to a coil 362 of a normally-open/normally-closed (NO/NC) relay 364, closing normally-open contacts 366A and opening normally-closed contacts 366B. Closing the contacts 366A clears a bistable multivibrator 368B and closing the contacts 366B resets the bistable multivibrator 368B.

A NOT-Q output of the bistable multivibrator 368B is used to clock a bistable multivibrator 368A. Upon receipt of a second clock signal from the bistable multivibrator 368B, Q and K terminals go high. This high at the Q and K terminals switches a field-effect transistor (FET) 370 which supplies power to the coil 296 of the relay 294 of FIG. 15B, thereby latching the relay 294. As can be seen in FIG. 15B, the relay 294, by energizing the coil 282 of the relay 284, latches the relay 284, thereby producing 8 VL.

Continuing to refer to FIG. 15B, when the relays 284 and 294 latch the circuit on, a field-effect transistor (FET) 372 is turned on and the FET 372 energizes a green light-emitting diode LED 374.

Figure 15F:
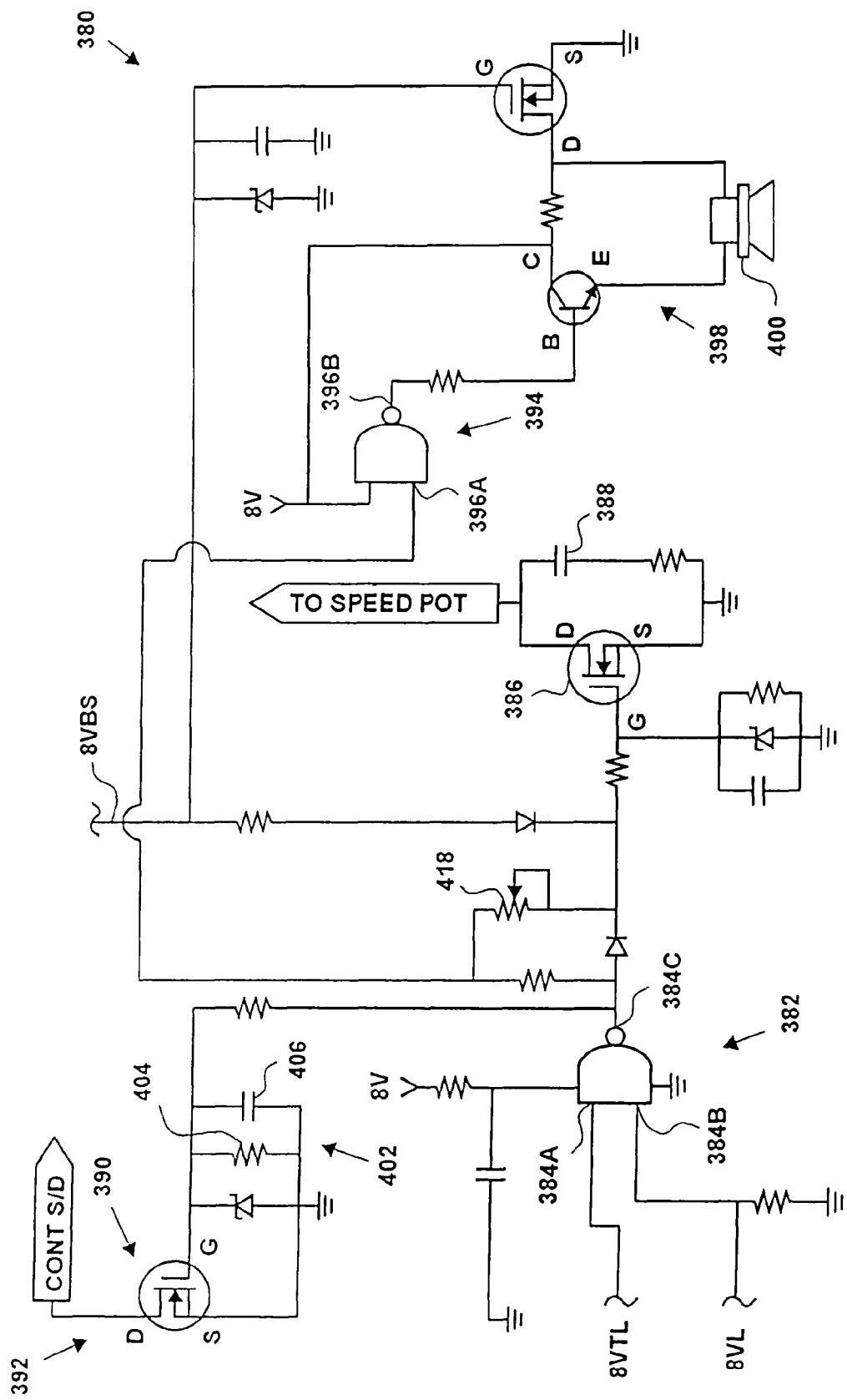
FIG. 15F is a schematic drawing of the soft start/stop control and the start-up alarm of block G of FIG. 14.

Referring now to FIG. 15F (block G of FIG. 14), a soft start-stop control of a soft start-stop control and start-up alarm 380 receives 8 VL from the relay 284 of FIG. 15B. With the relays 284 and 294 latched, a NAND gate 382 has a high on pins 384A and 384B. This causes a pin 384C of the NAND gate 382 to switch low. With the pin 384C of the NAND gate 382 low, a field-effect transistor (FET) 386 switches open, allowing a capacitor 388 to charge. The charging of capacitor 388 allows the main motor controller to soft start. The voltage for charging the capacitor 388 comes from a main motor controller (not shown, not a part of the present invention). On FIG. 15F, this connection is marked, "to speed pot."

The low on the pin 384C of the NAND gate 382 also causes a field-effect transistor (FET) 390 to switch open, allowing a controller shutdown circuit 392, which includes the FET 390, to switch to an open, or to a non-shutdown state. The low at the pin 384C of the NAND gate 382 also provides a signal to a NAND gate 394. When a pin 396A of the NAND gate 394 is switched low, a pin 396B of the NAND gate 394 switches high. A high in the pin 396B actuates a start-up alarm 398 that includes a piezoelectric alarm, or speaker, 400 and discrete components, as shown.

The start-up alarm 398 supplies a short audio signal indicating that the timed-opportunity switch 214 of FIGS. 15B-15F is in a start up sequence at the NAND gate 382. If either pin 384A or pin 384B of the NAND gate 382 switches low, output at the pin 384C of the NAND gate 382 will switch high.

Continuing to refer to FIG. 15F, the soft start-stop control of 380 provides means for achieving a soft stop as follows: a high at the pin 384C of the NAND gate 382 causes the FET 386 to turn on which results in a discharge of the capacitor 388, dropping voltage in a port labeled "to speed pot." This will cause the main motor controller to do a soft stop.

In addition, a high at the pin 384C of the NAND gate 382 will cause the FET 390 to switch on, thereby providing a ground and shutdown condition for a controller shutdown port that is labeled "CONT S/D." This feature is useable in any type of conveyance in which means is provided for shutdown by grounding a port.

The present invention also includes a redundancy feature for achieving a positive shutdown, although not a soft stop. A RC circuit 402 that includes a resistor 404 and a capacitor 406 delays controller shutdown until the soft stop, as described above, has had time to occur.

Referring again to the antibounce control 360 of FIG. 15E, a third command signal 8 VMS to the bistable multivibrator 368A causes pins Q and K to switch high. This high, applied to the gate of the FET 370 will switch the FET 370 open, interrupting power to the coil 296 of the relay 294 of FIG. 15B, and thereby causing the relay 294 to open.

Opening the relay 294 interrupts power to the coil 282 of the relay 284, thereby causing the relay 284 to switch open and the timed-opportunity switch 214 of FIGS. 15A-15F to open.

A delay/chime potentiometer 418 of FIG. 15F selectably determines the time between latching of the relay 294 of FIG. 15B and initiation of soft start by the soft start-stop control of 380. In addition, this selectible time delay determines the number of chimes that the piezoelectric alarm 400 will sound before a soft start commences.

Figure 15G:
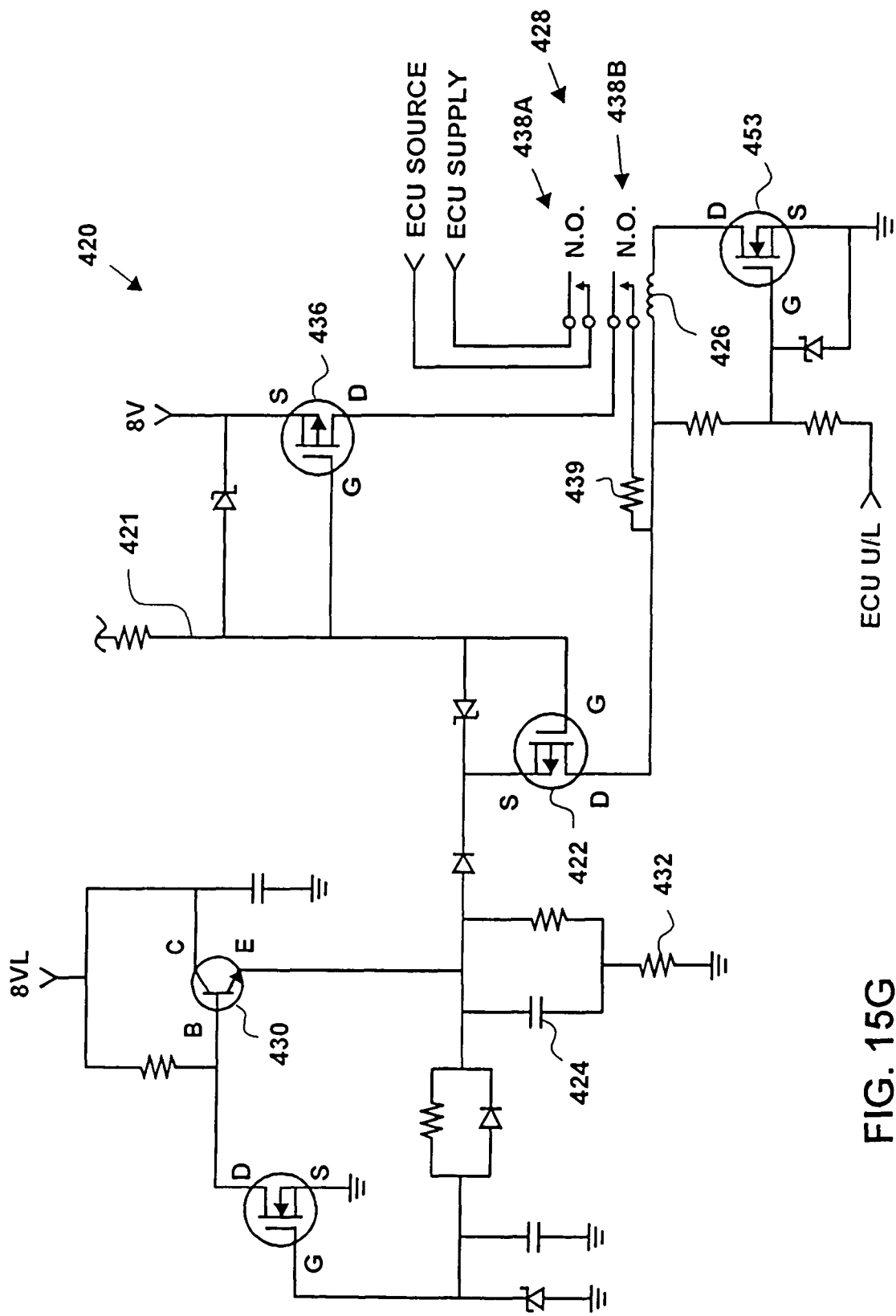
FIG. 15G is a schematic drawing of the ECU interface, as shown in FIG. 14, that is used to connect the timed-opportunity switch of FIG. 14 to the ECU of FIG. 17.

Referring now to FIGS. 15E, 15F, and 15G, an ECU interface 420 of FIG. 15G (block H of FIG. 14) latches the second time the NOT-Q terminal at the bistable multivibrator 368A of FIG. 15E is low. The J and NOT-Q terminals of the bistable multivibrator 368A are connected to the ECU interface 420 by a conductor 421.

Although NOT-Q at the bistable multivibrator 368A is low during the first command signal 8 VMS, and this low is applied to the gate of a field-effect transistor (FET) 422, switching the FET 422 to a conducting state, the conductor 8 VL is not supplying 8 VL to the ECU interface 420 of FIG. 15G at this time, nor is a capacitor 424 of FIG. 15G charged, so neither 8 VL nor a voltage from the capacitor 424 is supplied to a coil 426 via the now-conducting FET 422 to close a relay 428.

When a second command signal 8 VMS is initiated by sound-pressure switch 220 of FIG. 15A, and the relays 284 and 294 of FIG. 15B latch, there is a voltage in the conductor 8 VL, but NOT-Q at the bistable multivibrator 368A of FIG. 15E is high, resulting in an open state at the FET 422 of FIG. 15G. However, 8 VL is applied to the capacitor 424, and 8 VL charges the capacitor 424 which is connected in series with a transistor 430 and a resistor 432. The capacitor 424 will remain charged for approximately six seconds.

A third command signal 8 VMS from the sound-pressure switch 220 of FIG. 15A results in NOT-Q of the bistable multivibrator 368A of FIG. 15E switching low. This low at the bistable multivibrator 368A provides a signal that switches both the FET 422 and a field-effect transistor (FET) 436 to their respective conducting states. If the third command signal occurs during the six seconds that the capacitor 424 remains charged, the voltage of the capacitor 424 is then conducted through the FET 422 to the coil 426 of the relay 428, closing both pairs of normally-open contacts, 438A and 438B.

Figure 18:
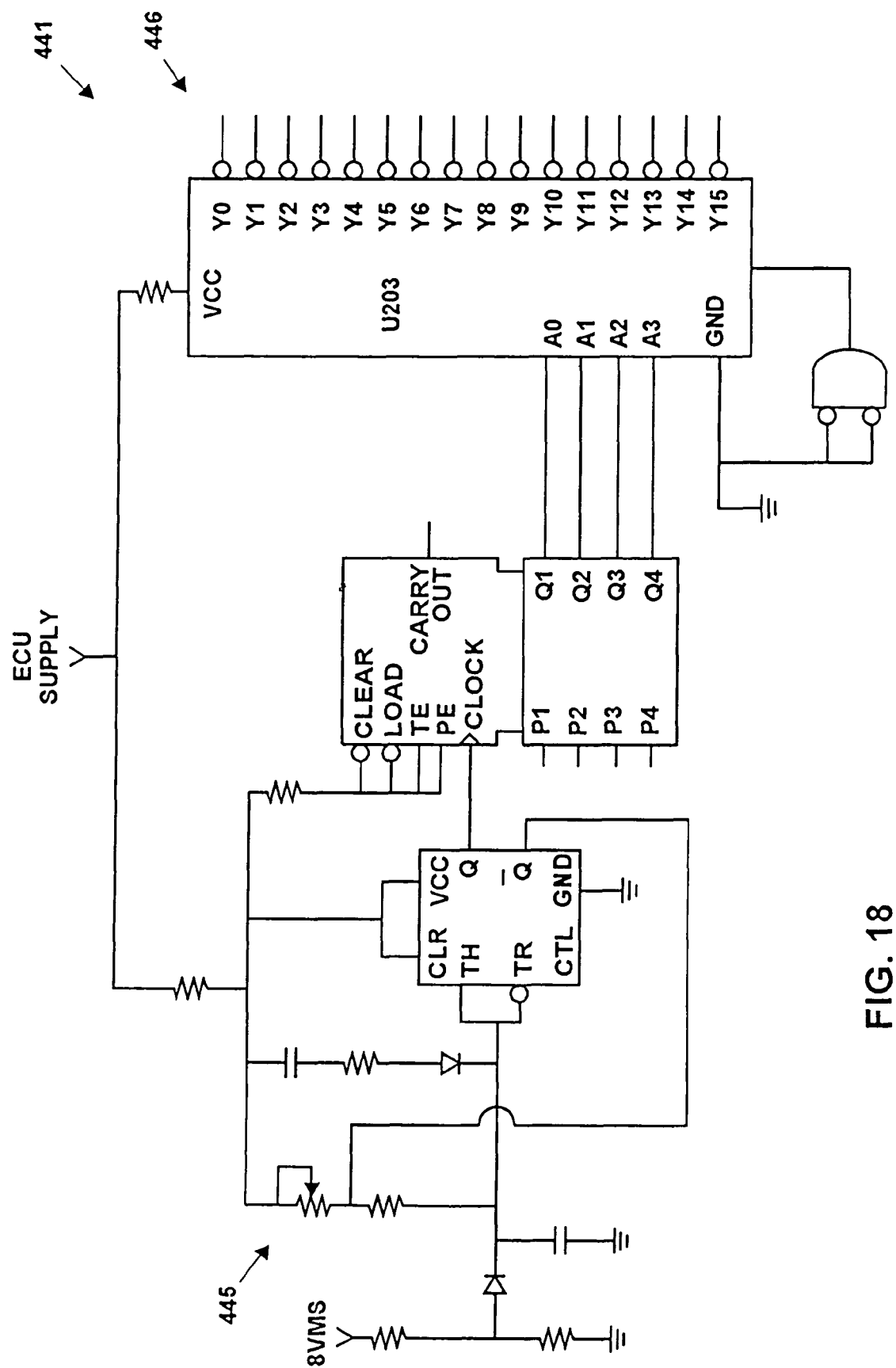
FIG. 18 is a schematic drawing of the timer and the counter/decoder of blocks L and M of FIG. 17.

Closing the normally-open contacts 438A connects an ECU source conductor to an ECU supply conductor of FIG. 15G, thereby connecting the ECU source conductor to the ECU supply conductor of FIG. 18. Closing of the normally-open contacts 438B supplies a voltage from an 8 volt supply, through the FET 436 and a resistor 439 to latch the relay 428, thereby continuing the supply of the source voltage to the supply terminals of FIG. 18.

Referring now to FIG. 18, an environmental control unit (ECU), or multiplexer 440 of FIG. 18 includes the circuits shown in FIGS. 18 to 22.

Referring now to FIG. 18, a timer/counter/decoder 441 is a complete detailed schematic of the preferred embodiments of both the timer of block L and the counter/decoder of block M of FIG. 17. Connection of the schematic drawing of FIG. 18 to the schematic of FIGS. 15A-15G is indicated as "ECU Supply" on FIG. 18. As shown, there are two connections from the schematic drawing of FIG. 15G to the schematic drawing of FIG. 18.

A cascade-rate potentiometer 445 controls the rate of sequencing of ECU status light display K of FIG. 17. That is, the potentiometer 445 selectively adjusts the time in which a command signal will initiate a task N of FIG. 17 or the escape P of FIG. 17.

Referring to FIG. 19, an ECU status 442 is a detailed schematic of the preferred embodiment of the light display that is represented by block K of FIG. 17. For an output device 216 shown in FIG. 18, the ECU status 442 must be duplicated 16 times, and each conductor 444 must be connected to a terminal of a counter/decoder 446 of FIG. 18.

The ECU status 442 indicates both task opportunities and escape opportunities that are shown in the indicator light display of block K of FIG. 17. Since, as shown by the indicator lights of block K, one escape opportunity follows each pair of task opportunities, to distinguish escape opportunities from task opportunities, LED indicators 448 of FIG. 19 include one color for task opportunities and another color for escape opportunities.

Referring now to FIG. 20, an ECU escape control 450 is a schematic drawing for block P of FIG. 17. Since, as shown in the light display of block K of FIG. 17, one escape opportunity is interposed between each successive pair of task opportunities, for the output device 216 shown in FIG. 18, the ECU escape control 450 of FIG. 20 must be duplicated five times, and each conductor 452 must be connected to a terminal of the counter/decoder 446 of FIG. 18.

Referring now to FIGS. 18-20, when the counter/decoder 446 of FIG. 18 sequences to any one of the five escape opportunities, a corresponding one of LED indicators 448 of the ECU status 442 of FIG. 19 will light. During the time that this particular LED indicator 448 indicates an escape opportunity, the counter/decoder 446 of FIG. 18 delivers the ECU supply voltage to the conductor 452 of the ECU escape control 450 of FIG. 20.

If a command signal 8 VMS is received at the conductor 8 VMS during this escape opportunity, the 8 VMS command signal causes a field-effect transistor (FET) 454 to conduct, resulting in a ground signal to the gate of a field-effect transistor (FET) 453 of FIG. 15G. When the FET 453 switches open, it interrupts the ground for the coil 426 causing the relay 428 to unlatch. With the relay 428 unlatched, the environmental control unit (ECU) 14 ceases to function and the timed-opportunity switch returns to standby status.

Figure 21:
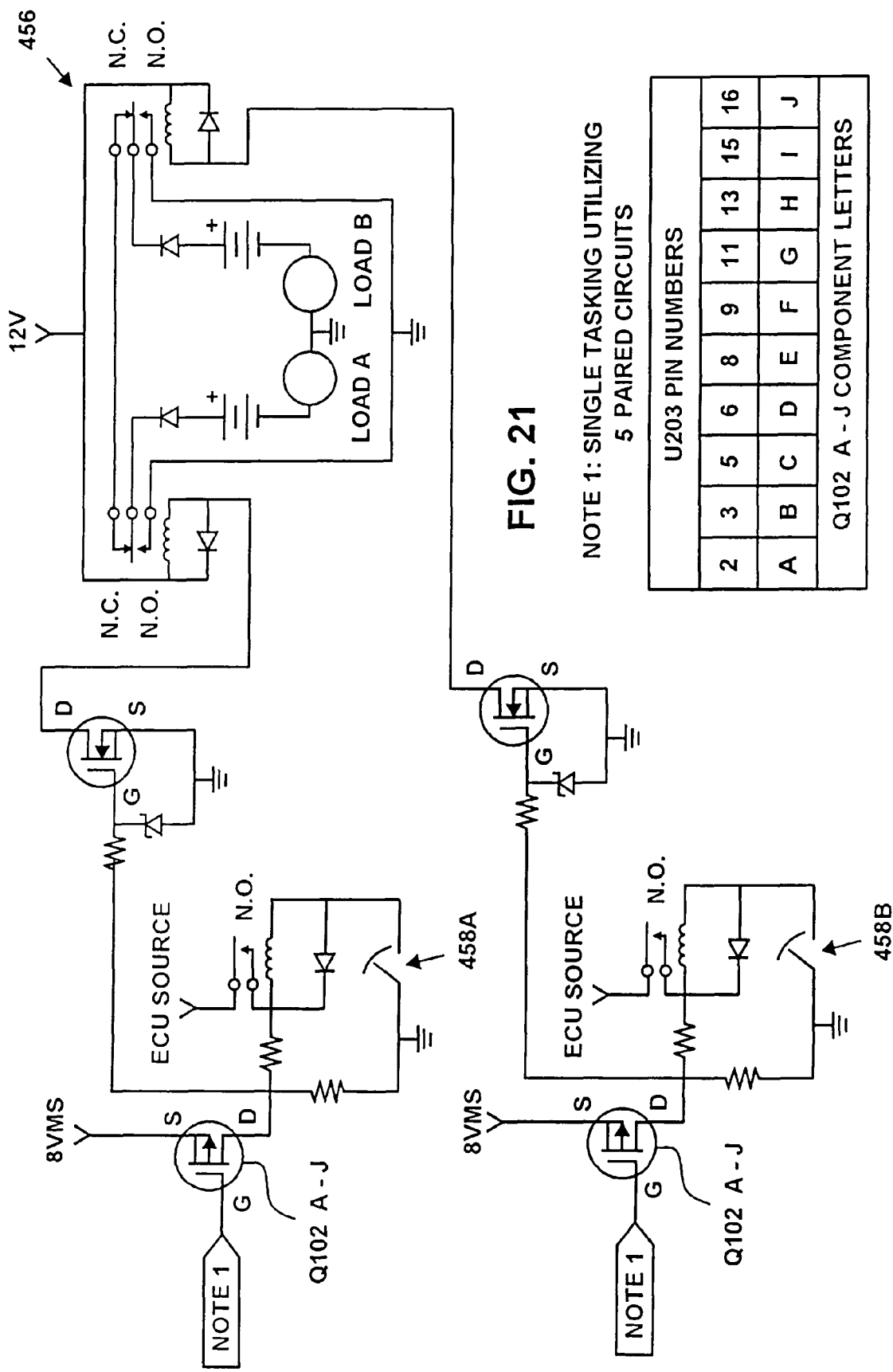
FIG. 21 is a schematic drawing of the single task control, for use in block N of FIG. 17, that may be duplicated up to ten times in the ECU of FIG. 17.

FIG. 21 is a detailed schematic drawing of a preferred embodiment of a single task control 456 that utilizes five single outputs from a sixteen output device of FIG. 18. As such, FIG. 21 provides circuitry that can be duplicated ten times to function as the task block N of FIG. 17.

When a latching switch 458A of FIG. 21 is open, a command signal 8 VMS results in momentary actuation of a load A. When the latching switch 458A is closed, a command signal 8 VMS results in latched, or continuous, actuation of the load A until a command signal 8 VMS is received by the ECU escape control 450 of FIG. 20. A latching switch 458B controls the mode of actuation of load B in like manner.

Figure 22:
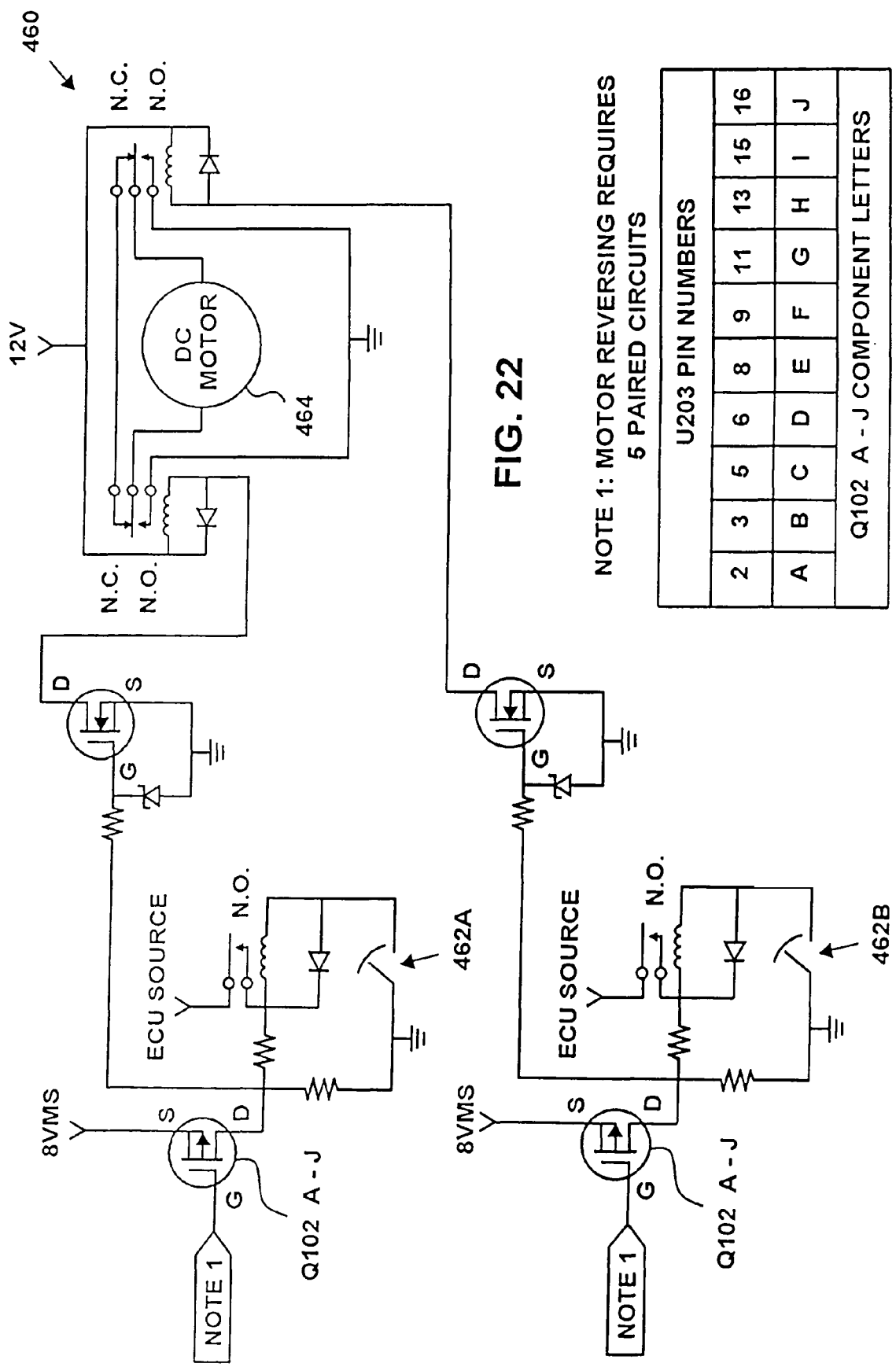
FIG. 22 is a schematic drawing of a reversible task control, for alternate use in block N of FIG. 17, that may be duplicated up to five times in the ECU of FIG. 17.

FIG. 22 is a detailed schematic drawing of a preferred embodiment of a reversible task control 460 that utilizes a single pair of outputs from the sixteen output device of FIG. 17. As such, FIG. 22 provides circuitry that can be duplicated five times to function as task block N of FIG. 17.

When a latching switch 462A is open, a command signal 8 VMS results in momentary actuation of a motor 464 in one rotational direction. When the latching switch 462A is closed, a command signal 8 VMS results in a latched, or continuous, rotation of the motor 464 in the same direction. A latching switch 462B controls momentary and continuous actuation of the motor 464 in like manner, but in opposite direction of rotation. Escape from continuous actuation is as described in conjunction with FIG. 21.

While five of either the single task controls 456 of FIG. 21 or five of the motor reversing controls 460 of FIG. 22 can be used to provide the function of block N of FIG. 17, any combination of FIGS. 21 and 22 may be used, in accordance with the type of loads that are to be switched by the ECU 440 of FIG. 17.

Figure 23:
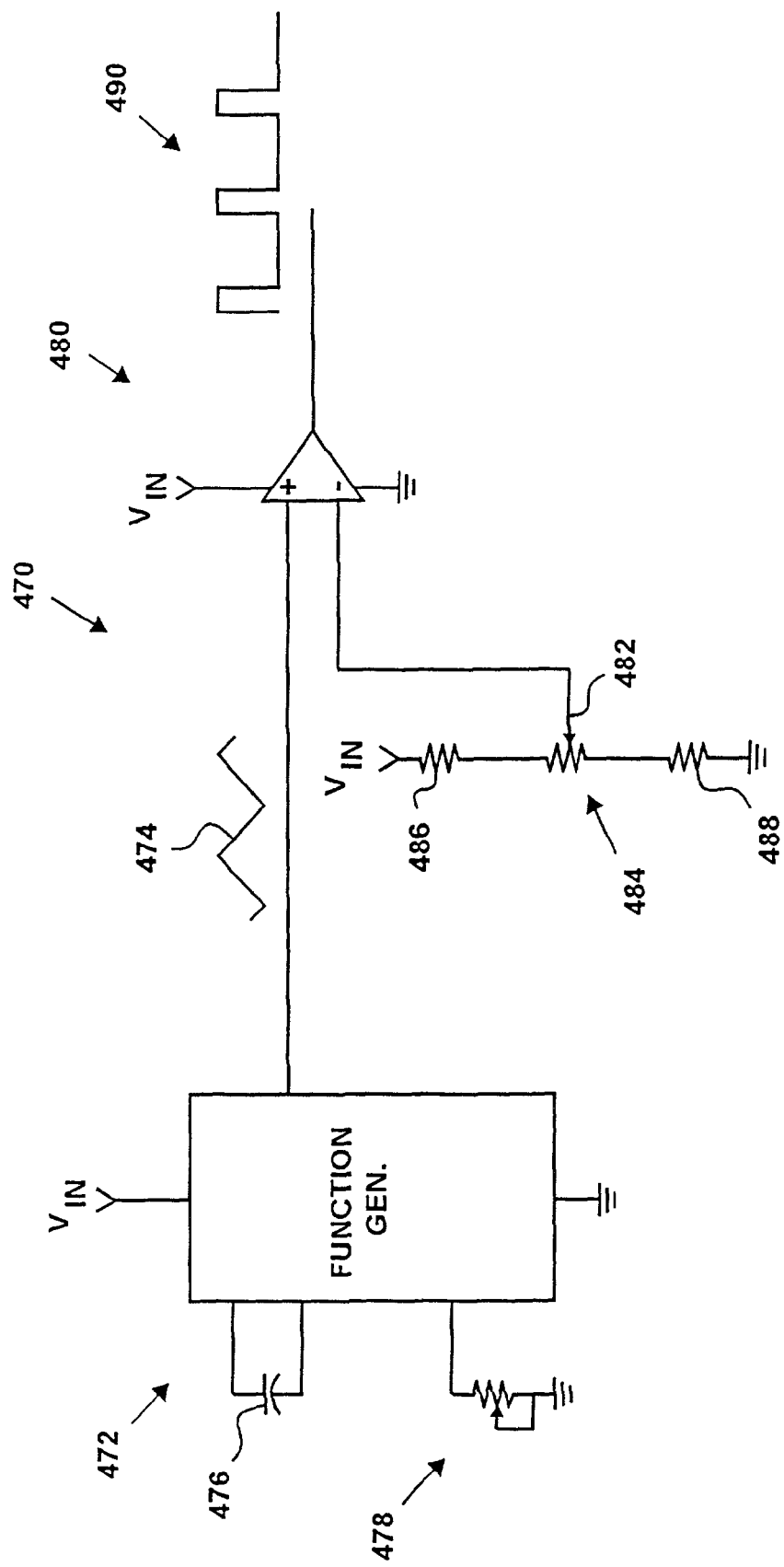
FIG. 23 is a schematic drawing of a rectangular-wave generator that may be used in the place of the rectangular-wave generator of FIG. 15C.

Referring now to FIG. 23, a variable rate/variable duty-cycle pulse generator, or rectangular-wave generator 470 may be used to replace the rectangular-wave generator 310 of FIG. 15C.

A function generator 472 is configured to output a triangle wave 474, a frequency of which is determined by a capacitor 476 and a potentiometer 478. More particularly, the frequency of the triangle wave 474 is equal to a selected resistance of the potentiometer 478 multiplied by a capacitance of the capacitor 476. An amplitude of the triangular output is variable from $0.25 V_{IN}$ to $0.75 V_{IN}$.

The triangle wave 474 is inputted to the non-inverting input of a comparator 480. The inverting input of the comparator 480 is connected to a wiper 482 of a potentiometer 484 which is variable, because of resistors 486 and 488, from $0.25 V_{IN}$ to $0.75 V_{IN}$.

When the wiper 482 is at $0.75 V_{IN}$, the output of the comparator 480 stays low since the voltage at the non-inverting input never exceeds the voltage of the inverting input. Similarly, when the wiper 482 is at $0.25 V_{IN}$, output of the comparator 480 stays high since the non-inverting input always exceeds the voltage on the inverting input.

With the wiper 482 at $0.50 V_{IN}$, the comparator 480 outputs a rectangular wave 490 with a fifty-percent duty cycle since the voltage at the non-inverting input is half the time higher than that of the inverting input and half the time lower.

In summary, by varying the wiper from $0.25 V_{IN}$ to $0.75 V_{IN}$, a rectangular wave 490 is generated with a duty cycle that is variable from zero to one hundred percent. Further, the duty cycle of the rectangular wave 490 is independent of frequency. Preferably, the function generator is Part No. EXAR 2206, manufactured by EXAR Corporation of San Jose, Calif.

Methods of the present invention, in addition to those recited in the independent claims and reflected in the aspects of the invention, include methods recited in the dependent claims, and in addition to, or alternately, those recited in the following paragraphs.

A method of the present invention includes: initiating a first command signal; starting a time-voltage function in response to the first command signal; selecting a window of opportunity in the time-voltage function; initiating a second command signal; shutting down the system unless the second command signal occurs entirely within the window of opportunity; starting a sensory-receivable signal if the second command signal occurs entirely within the window of opportunity; actuating a first apparatus if a third command signal is not received after the sensory-receivable signal; shutting down the first apparatus if the third command signal is received subsequent to actuation of the first apparatus; accessing a multiplexer rather than the first apparatus if the third command signal is received during the sensory-receivable signal; automatically sequencing the multiplexer through groups of task and escape opportunities; actuating a task in response to a command signal received during a task opportunity; escaping from the multiplexer in response to a command signal received during an escape opportunity; and indicating conditions and opportunities with indicator lights.

Further, a method of the present invention includes: initiating a first command signal; starting a rectangular-wave function in response to the first command signal; selectively varying both period and dwell of the rectangular wave; determining acceptable and prohibited times for accepting a second command signal in relation to the rectangular wave; initiating a second command signal; shutting down the system if the second command signal occurs during a prohibited time; starting an audible signal if the second command signal occurs during an acceptable time; actuating a main motor controller if a third command signal is not received before a predetermined time subsequent to ending the audible signal; shutting down the main motor controller if the third command signal is received subsequent to actuation of the main motor controller; actuating a multiplexer rather than the main motor controller if the third command signal is received during the aforesaid audible signal; automatically sequencing the multiplexer switch through groups of task and escape opportunities; actuating a task in response to a command signal received during a task opportunity; escaping from the multiplexer in response to a command signal received during an escape opportunity; and indicating both conditions and opportunities with indicator lights.

Finally, a method of the present invention further includes: both activating and deactivating an apparatus and both accessing and escaping from an ECU with a single user-actuated switch or transducer; requiring two sequential inputs, with the first input timed and the second input disposed entirely within a window of opportunity for start-up to prevent accidental start-ups; providing an ECU with internal polarity reversing capability for motor reversing; varying the time-duration of the window of opportunity and time delays both preceding and following the window of opportunity; adjusting microphone gain and or threshold to facilitate sound-pressure switching; using two command signals to activate an apparatus and a third command signal to deactivate the apparatus; alternately using the third command signal to access an ECU and using successive command signals to command tasks and to escape from the ECU; momentarily activating or latching task circuits; providing a light display that constantly displays system status; and providing a light display that displays task and escape opportunities.

In summary, the present invention provides apparatus and method for performing digital logic functions, such as switching, in response to output signals that are differentiated with respect to time. The output signals are generated proportional to inputs. The inputs may be any means or method. In a preferred embodiment, body-member gestures are used for inputs.

As defined herein, a body-member gesture is movement of a body-member in a direction that produces a desired change in an output signal, that produces a desired direction of change in an output signal, and/or that is used to achieve a desired switching function, to control an apparatus, and/or to achieve control of an apparatus.

That is, a user makes a body-member gesture that produces, controls, or makes a desired change in an output signal. In response to a predetermined rate-of-change of the output signal, a switching function is produced. The switching function is produced by differentiating the output signal.

Since switching occurs at a predetermined rate-of-change of the output signal, a switch output status remains unchanged when a rate-of-change switch is in any static position, and whenever a gesture is at a velocity below that which will produce the required rate-of-change of the output signal.

Since a rate-of-change of the output signal is directly proportional to the velocity of the gesture, it is equally accurate to say that the switch output status is changed as a function of the velocity of the gesture or at a predetermined rate-of-change of the output signal.

More particularly, an output of a mechanical-to-electrical transducer is differentiated once or twice as a function of time, and logic is performed as a function of the first and/or the second differentiated outputs.

Further, the present invention provides apparatus and method for controlling a device in response to proportional inputs to a transducer, and for performing digital logic as a function of proportional outputs of the transducer.

Still further, the present invention provides apparatus and method for selecting from a plurality of controllable tasks, and selectively controlling each selected task by actuation of any type of switch, or by inputs to a mechanical-to-electrical transducer that produces outputs that are proportional to inputs.

Finally, the present invention provides apparatus and method for initiating a control system in response to outputs from a mechanical-to-electrical transducer that are proportional to inputs thereto, for selective control of either a first or a second electrical device in response to outputs from the transducer, for controlling the first device proportional to outputs from the transducer, for selecting tasks to be performed from the second device in response to outputs from the transducer, and for controlling the selected tasks in response to outputs from the transducer.

While specific apparatus and method have been disclosed in the preceding description, it should be understood that these specifics have been given for the purpose of disclosing the principles of the present invention and that many variations thereof will become apparent to those who are versed in the art. Therefore, the scope of the present invention is to be determined by the appended claims.

What is claimed is:
1. A switch which comprises:
   a. a tilt-sensitive transducer that produces an output signal in response to a user input;
   b. a first differentiator adapted to receive said output signal and adapted to determine a first derivative of said output signal;

c. a second differentiator connected to said first differentiator adapted to determine a second derivative of said output signal representing a rate-of-change of the output signal; and d. means, connected to said second differentiator, for performing a first switching function based at least in part on the rate-of-change of the output signal.

2. A switch as claimed in claim 1 which further comprises means, connected to said first differentiator, for performing a second switching function.

3. A method which comprises:

body-member tilting a first tilt-sensitive transducer;

producing a first output signal proportional to said tilting step;

differentiating said first output signal with respect to time and determining a rate-of-change; and performing a first switching function in response to said differentiated first output signal based on said rate-of-change;

wherein performing a switching function that includes momentary contact switching, and said method further comprises:

initiating a sequential plurality of time delays in which one is a window of opportunity;

refraining from said momentary-contact switching step during a first time delay that follows said initiating step;

performing said momentary-contact switching step within said window of opportunity that follows said first time delay;

refraining from said momentary-contact switching step during a second time delay that follows said window of opportunity; and initiating operation of a first electrical device subsequent to successful completion of the preceding steps.

4. A method as claimed in claim 3 in which said method further comprises:

a. body-member tilting a second tilt-sensitive transducer;

b. producing a second output signal proportional to said tilting of said second tilt-sensitive transducer;

c. differentiating said second output signal with respect to time; and d. performing a logic output as a function of said first and second differentiated output signals.

5. A method as claimed in claim 3 in which said method further comprises:

a. momentary-contact switching during said second time delay; and b. initiating operation of a second electrical device in response to said momentary-contact switching step occurring during said second time delay.

6. A method which comprises:

a. producing an output signal;

b. determining a first rate-of-change of said output signal;

c. selectively performing a switching function in response to said output signal and based at least in part on said first rate-of-change exceeding a predetermined rate-of-change threshold;

d. determining a second rate-of-change of said output signal; and e. preventing variations in said output signal from performing said switching function based at least in part on said second rate-of-change not exceeding said predetermined rate-of-change threshold.

7. A method as claimed in claim 6 in which said method further comprises activating control of an apparatus in response to said switching function.

8. A method as claimed in claim 6 in which said method further comprises controlling an apparatus in response to said output signal.

9. A method as claimed in claim 6 in which said method further comprises activating control of an apparatus in response to said switching function being performed inside a window of opportunity.

10. A method as claimed in claim 6 in which said method further comprises:

a. activating control of an apparatus in response to said switching function being performed inside a window of opportunity; and b. aborting said activating step in response to said switching function being performed outside said window of opportunity.

11. A method as claimed in claim 6 in which said method further comprises activating a shut-down function of an apparatus in response to said switching function.

12. A method as claimed in claim 6 in which said method further comprises activating a selected one of a first or a second apparatus in response to said switching function.

13. A method as claimed in claim 6 in which said method further comprises:

a. activating a selected one of a first or a second apparatus in response to performing said switching function during a window of opportunity; and b. proportionally controlling a function of said selected apparatus as a function of said proportional output signal.

14. A method as claimed in claim 6 in which said method further comprises:

a. activating a selected one of a first or a second apparatus in response to performing said switching function during a window of opportunity;

b. selecting a function of said selected apparatus to be controlled; and c. said selecting step comprises performing an other switching function.

15. A method as claimed in claim 6 in which said method further comprises:

a. activating a selected one of a first or a second apparatus in response to performing said switching function during a window of opportunity;

b. selecting a function of said selected apparatus to be controlled;

c. said selecting step comprises performing an other switching function;

d. controlling said selected function; and e. said controlling step comprises performing still an other switching function.

16. A method as claimed in claim 6 in which said method further comprises:

a. initiating cascading a plurality of task opportunities;

b. selecting a task; and c. said selecting step comprises performing said switching function.

17. A method as claimed in claim 6 in which said method further comprises:

a. initiating cascading a plurality of task opportunities;

b. selecting a task;

c. said selecting step comprises performing said switching function;

d. selectively controlling said task; and e. said selective controlling step comprises performing an other switching function.

18. A method as claimed in claim 6 in which said method further comprises:

a. initiating cascading a plurality of task opportunities; and b. said initiating step comprises performing said switching function.

19. A method as claimed in claim 6 in which said method further comprises:

a. initiating cascading a plurality of task opportunities;

b. said initiating step comprises performing said switching function;

c. selecting a task; and d. said selecting step comprises performing an other switching function.

20. A method as claimed in claim 6 in which said method further comprises:

a. initiating cascading a plurality of task opportunities;

b. said initiating step comprises performing said switching function;

c. selecting a task;

d. said selecting step comprises performing an other switching function;

e. selectively controlling said task; and f. said selective controlling step comprises performing still an other switching function.

21. A method as claimed in claim 6 in which said producing step comprises actuating an input.

22. A method as claimed in claim 6 in which said producing step comprises body-member actuating an input.

23. A method as claimed in claim 6 in which said selectively performing step further comprises selectively adjusting said predetermined rate-of-change threshold.

24. A method as claimed in claim 6 in which at least one of said determining steps comprises differentiating said output signal.

* * * * *